(12) United States Patent
Saito et al.

(10) Patent No.: US 9,946,242 B2
(45) Date of Patent: Apr. 17, 2018

(54) OPERATION SCHEDULE OPTIMIZING DEVICE, METHOD, AND PROGRAM WITH DETERMINATION OF WHETHER TO REQUEST USER APPROVAL

(71) Applicant: Kabushiki Kaisha Toshiba, Minato-ku (JP)

(72) Inventors: Masaaki Saito, Itabashi (JP); Dai Murayama, Musashino (JP); Yutaka Iino, Kawasaki (JP); Nagako Hisada, Koganei (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 624 days.

(21) Appl. No.: 14/381,411

(22) PCT Filed: May 27, 2014

(86) PCT No.: PCT/JP2014/064007
§ 371 (c)(1),
(2) Date: Aug. 27, 2014

(87) PCT Pub. No.: WO2015/005005
PCT Pub. Date: Jan. 15, 2015

(65) Prior Publication Data
US 2015/0323921 A1 Nov. 12, 2015

(30) Foreign Application Priority Data
Jul. 10, 2013 (JP) .................................. 2013-144576

(51) Int. Cl.
*G05B 19/042* (2006.01)
*G06Q 10/04* (2012.01)
(Continued)

(52) U.S. Cl.
CPC ......... *G05B 19/0428* (2013.01); *G06Q 10/04* (2013.01); *G06Q 10/06* (2013.01);
(Continued)

(58) Field of Classification Search
None
See application file for complete search history.

(56) References Cited

U.S. PATENT DOCUMENTS 5,115,967 A  5/1992 Wedekind
5,197,666 A  3/1993 Wedekind
(Continued)

FOREIGN PATENT DOCUMENTS

CN  102073272 A  5/2011
JP  7-120180 A  5/1995
(Continued)

OTHER PUBLICATIONS

International Search Report dated Sep. 2, 2014 in PCT/JP2014/064007 with English Translation of Category of Cited Documents.
(Continued)

*Primary Examiner* — Eric C Wai
(74) *Attorney, Agent, or Firm* — Oblon, McClelland, Maier & Neustadt, L.L.P.

(57) ABSTRACT

An optimized operation schedule of a control-target apparatus is ensured while maximally reducing a burden share to a facility operator. An energy predictor sets, for a control-target apparatus, a predicted value of energy consumption or energy supply within a predetermined future time period based on process data. A schedule optimizer optimizes an operation schedule of the control-target apparatus within the predetermined time period with a predetermined evaluation barometer based on the predicted value, the characteristic of the control-target apparatus, and the process data. An approval request determiner determines a necessity of an
(Continued)

approval for a latest operation schedule based on a preset determining condition. A determination result transmitter transmits a determination result by the approval request determiner.

7 Claims, 13 Drawing Sheets

(51) Int. Cl.

| | | |
|---|---|---|
| *G06Q 10/06* | (2012.01) | |
| *H02J 3/00* | (2006.01) | |
| *H02J 3/46* | (2006.01) | |
| *G06Q 50/16* | (2012.01) | |
| *G05D 3/12* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |
| *G05D 23/00* | (2006.01) | |

(52) U.S. Cl.
CPC ............... *H02J 3/00* (2013.01); *H02J 3/46* (2013.01); *G05B 2219/24075* (2013.01); *G05B 2219/2639* (2013.01); *G06Q 50/16* (2013.01); *H02J 2003/003* (2013.01); *Y02E 40/76* (2013.01); *Y04S 10/54* (2013.01); *Y04S 10/545* (2013.01)

(56) References Cited

U.S. PATENT DOCUMENTS

| | | |
|---|---|---|
| 2012/0296480 A1 | 11/2012 | Raman et al. |
| 2013/0110934 A1 | 5/2013 | Shibuya et al. |
| 2014/0094980 A1 | 4/2014 | Saito et al. |
| 2014/0163757 A1 | 6/2014 | Murayama et al. |
| 2014/0188295 A1 | 7/2014 | Saito et al. |
| 2014/0278650 A1* | 9/2014 | Bagheri ......... G06Q 10/063116 705/7.16 |

FOREIGN PATENT DOCUMENTS

| | | |
|---|---|---|
| JP | 2004-317049 A | 11/2004 |
| JP | 2006-266520 A | 10/2006 |
| JP | 2008-289276 | 11/2008 |
| JP | 4296140 B2 | 7/2009 |
| JP | 2011-106779 A | 6/2011 |
| JP | 2012-80679 A | 4/2012 |
| JP | 2014-96946 A | 5/2014 |
| JP | 2014-152984 A | 8/2014 |
| WO | WO 2012/173189 A1 | 12/2012 |
| WO | WO 2013/128953 A1 | 9/2013 |

OTHER PUBLICATIONS

Search Report dated Jan. 30, 2015 in Singapore Patent Application No. 11201405401U.

* cited by examiner

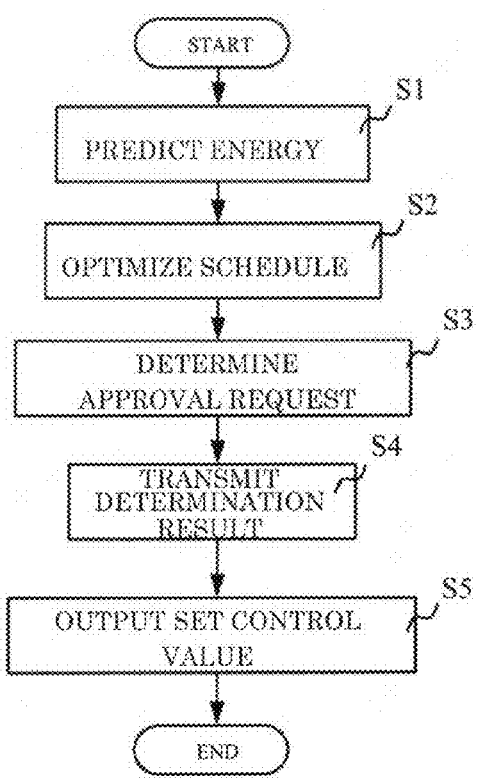

*FIG. 5*

| VARIABLE NAME | PHYSICAL QUANTITY | UPPER/LOWER LIMIT | UNIT |
|---|---|---|---|
| $X1$ | ELECTRICITY USAGE QUANTITY | $0 \leq X1 \leq$ CONTRACTED POWER | [kWh] |
| $X2$ | ABSORPTION WATER COOLER/ HEATER LOADING FACTOR (EXHAUST HEAT LOADING MODE) | LOWER LIMIT $\leq X2 \leq 1$ | - |
| $X3$ | ABSORPTION WATER COOLER/ HEATER LOADING FACTOR (PRODUCE COLD WATER, USE GAS) | LOWER LIMIT $\leq X3 \leq 1$ | - |
| $X4$ | ABSORPTION WATER COOLER/ HEATER LOADING FACTOR (PRODUCE HOT WATER, USE GAS) | LOWER LIMIT $\leq X4 \leq 1$ | - |
| $X5$ | ELECTRIC REFRIGERATOR LOADING FACTOR | LOWER LIMIT $\leq X5 \leq 1$ | - |
| $X6$ | CGS LOADING FACTOR | LOWER LIMIT $\leq X6 \leq 1$ | - |
| $X7$ | REMAINING QUANTITY OF STORED HEAT | $0 \leq X7 \leq$ HEAT STORAGE CAPACITY | [kWh] |
| $X8$ | SOC | $0 \leq X8 \leq$ BATTERY CAPACITY | [kWh] |

*FIG. 6*

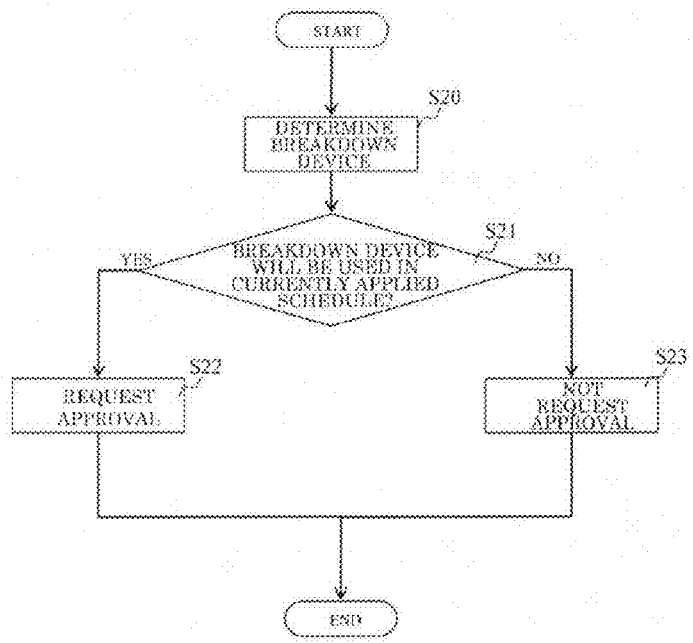
FIG. 14
| | 16:00 CURRENT TIME | 16:00 | 17:00 | 18:00 | 19:00 | 20:00 | 21:00 | 22:00 | 23:00 |
|---|---|---|---|---|---|---|---|---|---|
| DEVICE A | 1 | 1 | 1 | 1 | 1 | 1 | 1 | 1 | 1 |
| DEVICE B | 1 | 1 | 1 | 1 | 0 | 0 | 0 | 0 | 0 |
| BREAK-DOWN→ DEVICE C | 0 | 0 | 0 | 0 | 0 | 0 | 0 | 0 | 0 |
| BREAK-DOWN→ DEVICE D | 0 | 0 | 0 | 1 | 1 | 1 | 0 | 0 | 0 |
FIG. 15
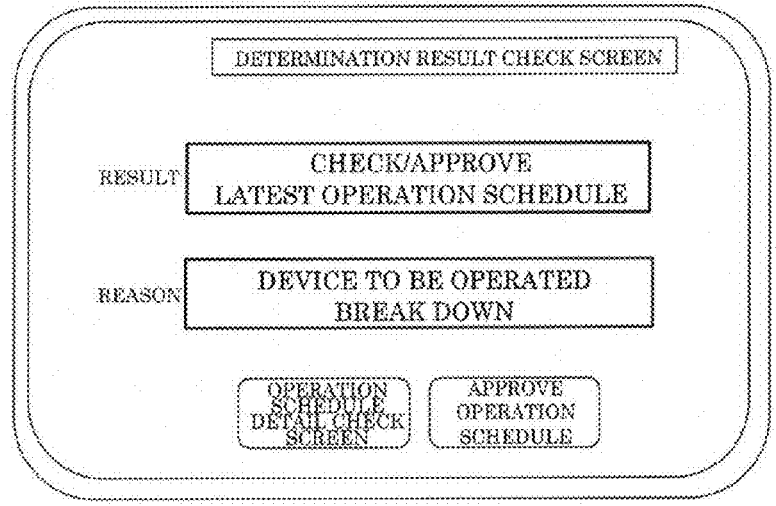
FIG. 16

OPERATION SCHEDULE OPTIMIZING DEVICE, METHOD, AND PROGRAM WITH DETERMINATION OF WHETHER TO REQUEST USER APPROVAL

CROSS-REFERENCE TO RELATED APPLICATIONS

This application is based upon PCT/JP2014/064007 filed May 27, 2014, and claims the benefit of priority from Japan Patent Application No. 2013-144576, filed on Jul. 10, 2013, the entire contents of each of which are incorporated herein by reference.

FIELD

Embodiments of the present disclosure relate to an operation schedule optimizing device, an operation schedule optimizing method, and an operation schedule optimizing program which optimize an operation schedule of a device that is a control target.

BACKGROUND

Recently, an effort for a smart community is intensified. In a smart community, various urban infrastructures, such as electricity and traffic, are integrated and managed using an IT technology, and an urban development to optimize energy usage as a whole city or local area is set as a goal. An example application of the smart community is a demand-response (hereinafter, referred to as DR).

The DR is a mechanism which induces or promotes a reduction of the quantity of power usage at the power consumer's end, such as a house or a building, mainly when the need for reduction of power consumption becomes apparent like when a power demand/supply balance becomes tight, thereby realizing an optimized energy usage as a whole city or local area. The way of realizing such a mechanism is to increase a purchased power unit price, or to give an incentive in accordance with the reduced quantity of the power usage.

In the case of, in particular, a large-scale building, even if a part of the quantity of power usage is reduced by the DR, an impact applied to the local energy demand/supply is remarkable. In addition, according to the DR, when electricity/heat storage facilities that can store electric energy or thermal energy are utilized, a time at which the energy demand/supply should be balanced can be shifted.

"Electricity/heat storage" in electricity/heat storage facilities is to utilize the energy storage capacity of batteries and heat storage tanks, and to utilize electricity storage or heat storage, or, both of them. That is, the electricity/heat storage facilities are energy storage devices which have an important role as power adjusting power in order to optimize the energy usage as a whole local area.

To control various devices installed in a large-scale building, there is an operation schedule optimizing device that optimizes the operation schedules of the control-target apparatuses in accordance with a predetermined evaluation barometer. In this case, various devices to be controlled by the operation schedule optimizing device include, in addition to energy storage devices like the aforementioned electricity/heat storage facilities, energy supply devices and energy consuming devices. Patent Document 1 discloses a technology of optimizing the operation schedule of a device while reducing the energy consumption, reducing the power consumption, reducing the energy costs, and minimizing the quantity of $CO_2$ emission.

Meanwhile, according to the DR, an incentive that is a cost-benefit performance is important, and it is necessary to clarify the quantity of power usage reduced by a consumer in order to fairly determine such an incentive. Hence, a reference value to the quantity of power usage by a consumer is defined in many cases. The reference value to the quantity of power usage will be referred to as a base line.

The base line is an expected value of the quantity of power usage by a consumer when the quantity of power usage is not reduced by the DR, and is calculated based on the actual values of the quantities of power usage by a consumer within a past certain time period mainly when no DR was applied. That is, according to DR, a reduced quantity of power is obtained in accordance with a difference between the base line and the actual value of the quantity of power usage when the DR was applied, and thus an incentive is set. Hence, according to the DR, it is necessary to precisely and quantitatively predict the quantity of power usage in order to optimize the operation schedule of a device.

In practice, however, various unexpected events occur, and it is difficult to precisely predict the quantity of power usage. Example unexpected events are a breakdown of a co-generation or power generation facilities including a PV, an output fluctuation, and a change in the demand quantity of power and heat. When those events occur, a dissociation different from the prediction presumed in advance inevitably occurs, and thus the quantity of power usage becomes out of the predicted range.

Hence, it is necessary to review the operation schedule of a device appropriately in accordance with a situation time by time, and to adjust the predicted value of the quantity of power usage. Therefore, a technology of comparing an actual value of a given item at a predetermined operation timing with the predicted value in advance of that item, and of reviewing the operation schedule of a control-target apparatus based on the comparison result is expected. According to such an operation schedule optimizing technology, when a deviation between the actual value and the predicted value becomes larger than a preset threshold, it is determined that a dissociation different from the prediction presumed in advance occurs, the operation schedule of the control-target apparatus is reviewed, and the operation schedule is optimized again.

According to the above-explained technology, however, the setting of the threshold is difficult. For example, it is presumed that the heat storage remaining level of a heat storage tank is reduced beyond the predicted scheduled value, and the heat storage remaining level becomes zero within a time period corresponding to a DR target time. When such a situation is predicted, the operation schedule of the device must be reviewed so as to compensate the shortage of the heat supply quantity while maintaining a desired power reduction quantity expected in the presumed schedule. Note that a DR target time is a time subjected to a reduction of the quantity of power usage by the DR.

However, how the actual power reduction quantity changes when the remaining heat storage quantity becomes zero varies depending on the following factors. A change in the power reduction quantity is determined based on various factors, such as the shortage quantity of heat, the kind of a heat-source device in operation, and that of a heat-source device additionally actuated, and characteristics thereof. When, for example, a heat-source device in operation is a gas heat source, and is partially loaded and operated. In this case, if the shortage quantity of heat is smaller than the available capacity thereof, it is sufficient if only the output by the gas heat source is increased, and the operation can be maintained without increasing the quantity of power usage.

Conversely, when the gas heat source is operated with a rated load, it is necessary to additionally actuate other heat-source devices. At this time, if the additionally actuated heat source device is an electric heat source, the quantity of power usage in the whole building rightfully increases in accordance with the characteristic of such a heat source and the heat supply quantity thereof. Hence, when a situation different from the prediction presumed in advance occurs, how the quantity of power usage in the whole building changes in future varies depending on a situation time by time. Accordingly, in order to optimize the operation schedule, when the threshold is uniquely set, it is difficult to flexibly cope with a situation changing time by time.

Therefore, there is proposed a technology of, not setting the threshold, but of setting an updating timing of the operation schedule, and reviewing the operation schedule at the set timing using the latest actual value. According to this technology, the setting of the threshold becomes unnecessary, and thus it is the simplest method as the operation schedule optimizing technology that can cope with an occurrence of an event different from the prediction presumed in advance if there is no constraint of a calculator, etc., that repeatedly calculates the operation schedule.

RELATED TECHNICAL DOCUMENTS

Patent Documents

Patent Document 1: JP 2008-289276 A

However, when the operation schedule is updated and optimized at the set timing, a facility operator needs to check the operation schedule and to approve the operation schedule every time the operation schedule is updated. The approval work of the operation schedule becomes a large burden share to the facility operator if the updating frequency of the operation schedule is high.

In particular, according to the DR, it is necessary for the facility operator to evaluate the cost-benefit performance based on the incentive, etc., and also to decide whether or not to accept the reduction of the quantity of power usage. In addition, the operation schedule of the building facilities largely changes depending on such a decision, and thus a final decision must be made by the facility operator. Therefore, a full automation of the approval of the optimized operation schedule is difficult according to the DR.

To reduce the burden share for the facility operator, the cycle of updating the operation schedule may be extended so as to reduce the number of approval works by the facility operator. However, the possibility that the quantity of power usage becomes out of the predicted range increases by what corresponds to the reduction of the frequency of updating the operation schedule. That is, like the case of the setting of the threshold, it is difficult to set an appropriate frequency to optimize the operation schedule of a device while maximally reducing the burden share for the facility operator in accordance with various situations.

SUMMARY

The embodiments of the present disclosure have been made to address the aforementioned problems, and it is an objective of the present disclosure to provide an operation schedule optimizing device, an operation schedule optimizing method, and an operation schedule optimizing program which ensure the optimized operation of a control-target apparatus while maximally reducing a burden share for a facility operator.

To accomplish the above objective, according to an embodiment of the present disclosure, an operation schedule optimizing device that is for a control-target apparatus which supplies, consumes or stores energy includes the following features (1) to (4).

(1) An energy predictor setting, for the control-target apparatus, a predicted value of energy consumption or energy supply within a predetermined future time period based on process data.

(2) A schedule optimizer optimizing an operation schedule of the control-target apparatus within the predetermined time period with a predetermined evaluation barometer based on the predicted value, a characteristic of the control-target apparatus, and the process data.

(3) An approval request determiner determining a necessity of an approval for a latest operation schedule based on a preset determining condition.

(4) A determination result transmitter transmitting a determination result by the approval request determiner.

BRIEF DESCRIPTION OF DRAWINGS

FIG. 5 is a flowchart illustrating a process procedure of the operation schedule optimizing device of the first embodiment;

FIG. 6 is a diagram collectively illustrating example variables X1 to X8 to be optimized in the first embodiment;

FIG. 14 is a flowchart illustrating a determining process according to a second embodiment;

FIG. 15 is a diagram illustrating a list of activated device after a current time according to the second embodiment;

FIG. 16 is a diagram illustrating an example screen to request an approval according to the second embodiment;

DETAILED DESCRIPTION

[A. First Embodiment]

[1. General Outline of Operation Schedule Optimizing Device]

Figure 1:
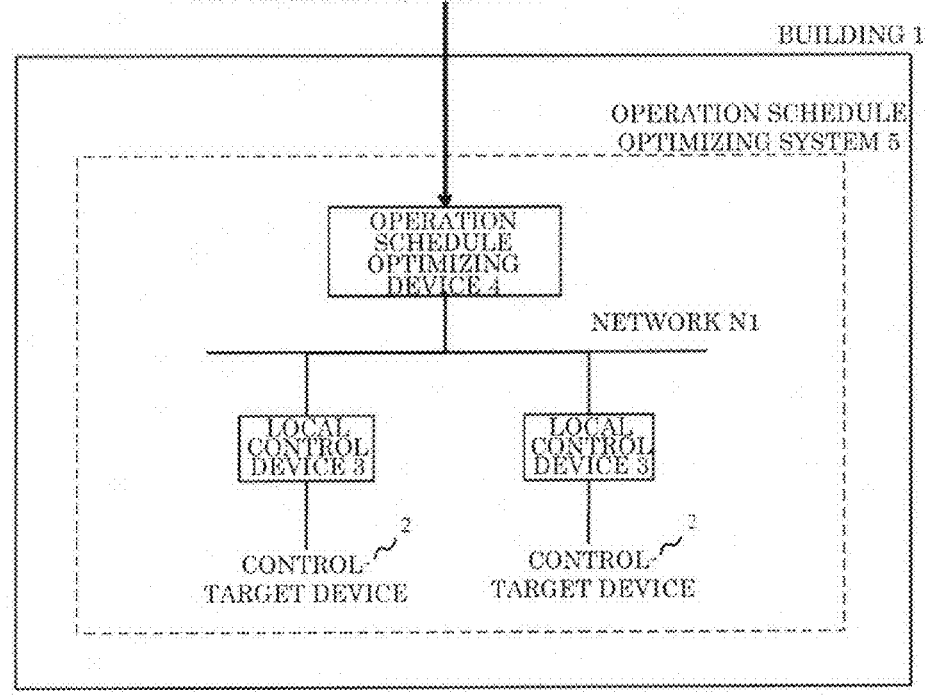
FIG. 1 is a block diagram illustrating a first embodiment.

An operation schedule optimizing system 5 of this embodiment includes, as illustrated in FIG. 1, various control-target apparatuses 2 installed in a target building 1, local control devices 3, and an operation schedule optimizing device 4.

[1-1. Control-Target Apparatus]

The control-target apparatuses 2 include at least one of an energy consuming device, an energy supplying device, and an energy storing device. Some control-target apparatuses 2 have two functions among the energy consuming device, the energy supplying device, and the energy storing device. The energy consuming device is a device that consumes supplied energy, and is, for example, an air conditioning device (air conditioner), a lighting device, or a heat-source device.

The energy supplying device is a device that supplies energy to the energy consuming device or the energy storing device, and is, for example, a solar power generation device (PV), or a solar water heater. The energy storing device is a device that stores supplied energy, and is, for example, a battery, or a heat storage tank.

[1-2. Local Control Device]

The local control device 3 is connected to the control-target apparatus 2, and controls the operation of each control-target apparatus 2, i.e., activation, deactivation, and output. In the following explanation, an activation and a deactivation will be collectively referred to as activation/deactivation in some cases.

This local control device 3 may be provided for each control-target apparatus 2, or may employ a structure to control multiple control-target apparatuses 2. The control by each local control device 3 is performed in accordance with control information from the operation schedule optimizing device 4 connected to each local control device 3 through a network N1.

[1-3. Operation Schedule Optimizing Device]

The operation schedule optimizing device 4 obtains roughly five kinds of information, such as a setting parameter, an incentive unit price, process data, a DR target time, and a base line, and optimizes the operation schedule of the control-target apparatus 2 based on those pieces of information.

(1) Operation Schedule

The operation schedule is a schedule of an operation of each control-target apparatus 2 for each time slot within a predetermined future time period. For example, the operation schedule contains activation/deactivation information on from which time and until which time the control-target apparatus 2 is activated, and information on from which time, until which time, and which control-target apparatus is activated when there are multiple control-target apparatuses 2.

In addition, the operation schedule contains information on the set level of the output by the control-target apparatus 2. For example, a control set value indicated by a quantitative numerical value with units, such as kW, kWh, is in the operation schedule. Such a control set value is a parameter to determine the operation status of each control-target apparatus 2.

For example, the control set value includes a set temperature value of the air conditioner that is an energy consuming device, a PMV set value, and the set brightness value of a light. Note that the term PMV means Predicted Mean Vote which is defined in a thermal index ISO 7730 of air conditioning. The PMV quantifies how a person feels coldness, 0 indicates comfort, − indicates cold, and + indicates warm. Parameters applied to calculate the PMV are a temperature, a humidity, an average radiative temperature, an amount of cloths, an activity level, a wind speed, etc.

(2) Setting Parameter

The setting parameter among information taken in the operation schedule optimizing device 4 is, for example, a process timing, a weight coefficient, an evaluation barometer, a device characteristic, and a process cycle, and includes various parameters applied to the process of this embodiment. The process timing is, in the case of "a process of optimizing a next day's operation schedule a day before" to be discussed later, a setting of a time at which an optimizing processor 40 (illustrated in FIG. 3) starts the process. The process cycle is a setting of a cycle at which the optimizing processor 40 starts the process in the case of "a process of recalculating the operation schedule on the day".

For example, when the process cycle is set to 10 minutes, the process by the optimizing processor 40 is started for every 10 minutes using the latest process data, etc. The weight coefficient is a coefficient applied to a similarity level calculation to be discussed later. The evaluation barometer is an index that should be minimized for optimization, such as energy consumption, energy supply, and costs.

The device characteristic that is an example of the setting parameter includes various parameters defined in accordance with the characteristic of each device, such as the rating of each control-target apparatus 2, the lower-limit output, and a COP. Those parameters include a parameter applied to various calculations to be discussed later. Note that COP (Coefficient Of Performance) is a performance coefficient of a heat-source device like a heat pump, and is obtained by dividing the cooling or heating performance by power consumption.

(3) Incentive Unit Price

Information that is an incentive unit price taken in the operation schedule optimizing device 4 is price information to calculate an amount of incentive that is obtained by multiplying the reduced energy in the energy consumption subjected to energy utility rate by the incentive unit price.

For example, such a unit price can be expressed as a unit, such as JP YEN/kW, or JP YEN/kWh.

In calculation of the incentive unit price, the energy subjected to the energy utility rate is the energy requiring a payment of a counter value when utilized, and includes, for example, electricity, and gas. Water is also this energy. Hence, the energy utility rate includes electricity rate, gas rate, and water rate.

The energy utility rate subjected to an incentive is, in general, an electricity rate, and is processed based on the electricity rate in this embodiment. When, however, other energy utility rates are also subjected to the incentive, the process for such subjects is also within the scope of the present disclosure.

(4) Process Data

The process data taken in the operation schedule optimizing device 4 includes information from the exterior which changes as time advances. For example, the process data includes weather data, and operation data. The weather data includes past weather data and weather forecast data. The operation data includes a past control set value of each control-target apparatus 2, the state quantity of each control-target apparatus 2 when the operation schedule was executed, and the breakdown condition thereof.

The state quantity of each control-target apparatus 2 when the operation schedule is executed which is one of the operation data includes the energy consumption of each control-target apparatus 2 and the energy generation thereof. For example, the state quantity includes the CGS (described in paragraph 0045) as an energy supplying device, an output by an electric refrigerator and absorption water cooler/heater, and a load factor, etc. In addition, the state quantity includes the discharging quantity of a battery that is an energy storing device, a heat storage quantity, a heat dissipation quantity by a heat storage device, and a heat storage quantity thereof.

(5) DR Target Time

Information that is the DR target time taken in the operation schedule optimizing device 4 is, as explained above, information on a time at which reduction of the quantity of power usage is attempted by the DR, and is a time at which the electricity unit price is increased, or a time at which an incentive is given if the quantity of power usage is successfully reduced.

(6) Base Line

The base line is a threshold of the quantity of power usage that will be a reference for as to whether or not an incentive is applied. This base line can be set based on the quantity of power usage by a consumer in the past certain time period. For example, the base line is calculated based on the actual value of the power consumption in a building, etc., in the past several days, or several weeks. The base line of this embodiment is, as an example, set in a unit of a day, and is one that is constant in a day.

[2. Connection Structure of Control-Target Apparatuses]

Figure 2:
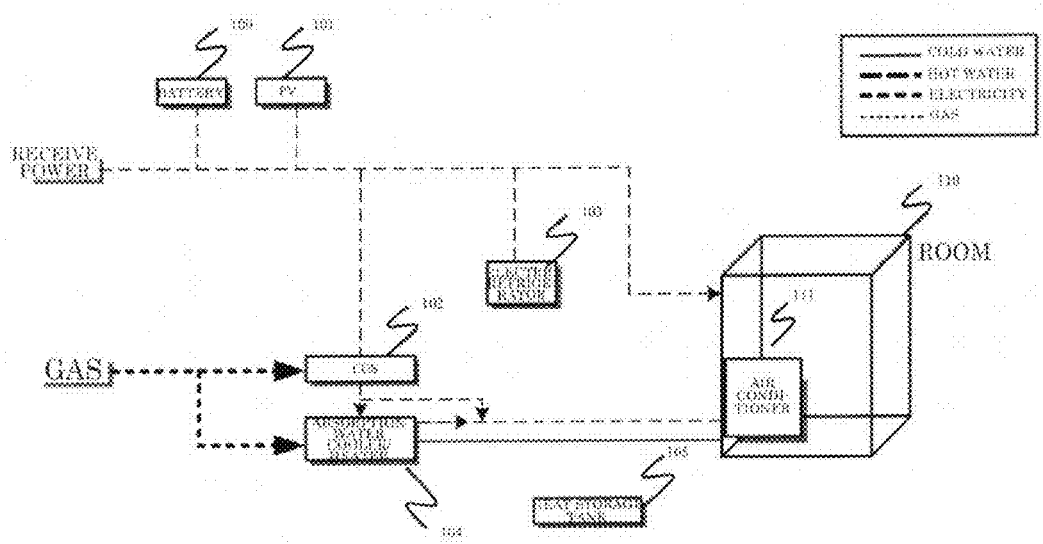
FIG. 2 is a diagram illustrating a connection structure of various control-target apparatus and respective flows of cold water, hot water, electricity, gas, etc., according to the first embodiment.

FIG. 2 illustrates the connection structure of the various control-target apparatuses 2 and an example energy flow. In FIG. 2, the thick line, the longer dashed line, the shorter dashed line, and the dotted line indicate the flow of cold water, the flow of hot water, the flow of electricity, and the flow of gas, respectively. The energy exchange relationship among those control-target apparatuses 2 is to supply electricity, cold heat, and hot heat to an air conditioner 111, etc., installed in a room 110 with the electrical power received from the exterior, and the gas supplied therefrom being as energy sources.

As the control-target apparatuses 2, a battery 100, a PV 101, a CGS 102, an electric refrigerator 103, an absorption water cooler/heater 104, and a heat storage tank 105 are installed. As the energy by the heat source, gas and exhaust heat from the CGS 102, etc., are available. The control-target apparatuses 2 illustrated in this figure are merely examples, and it is optional which control-target apparatus 2 is used or is not used.

The first embodiment is not intended to exclude control-target apparatuses 2 not exemplified. Other control-target apparatuses, such as a heat pump, a water-cooling refrigerator, and a solar water heater, are also installable. That is, the control target of this embodiment is not limited to the above-explained devices and structures, and a structure can be also employed in which some devices are omitted or the scheme of this embodiment is easily applicable when developed.

[2-1. Battery and PV]

The battery 100 is a facility utilizing a secondary battery which can perform both charging and discharging. The PV 101 is a power generating facility including a solar panel which converts the energy of solar light into electric energy. The PV 101 is a device that changes the supply quantity of electric energy depending on the climate condition like weather.

[2-2. CGS]

The CGS (Co-Generation System) 102 is a system which generates power by an internal combustion engine or an external combustion engine, and which utilizes exhaust heat. The CGS 102 of this example generates power using gas as an energy source, and utilizes exhaust heat. Thus, the CGS is a combined heat and power system. A fuel cell may be utilized for power generation and as a heat source.

[2-3. Electric Refrigerator, Absorption Water Cooler/Heater, and Heat Storage Tank]

The electric refrigerator 103 is a compressor refrigerator that performs cooling through a process of compression, condensation, and evaporation of a gas coolant, and utilizes an electric compressor to compress the coolant. The absorption water cooler/heater 104 is a device that supplies cold water or hot water by having processes of absorption of steam and regeneration by a heat source between the condenser of a coolant and an evaporator. The heat storage tank 105 is a tank that stores heat by a reserved heat medium. Those electric refrigerator 103, absorption water cooler/heater 104, and heat storage tank 105 supply hot water or cold water for the air conditioner 111 placed in the room 110.

[3. Structure of Operation Schedule Optimizing Device]

Figure 3:
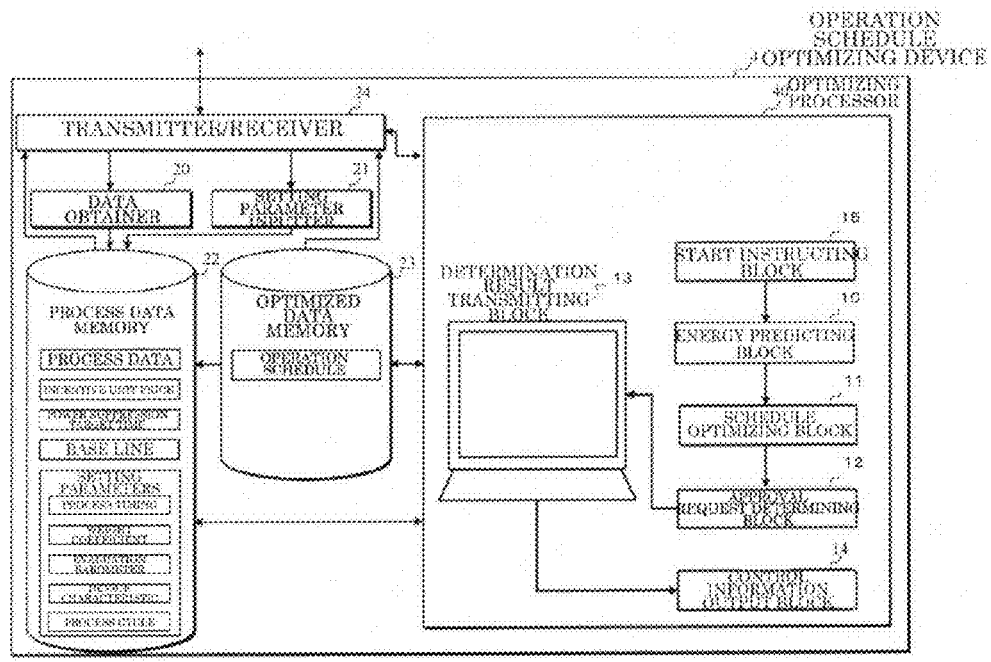
FIG. 3 is a block diagram illustrating a whole structure of an operation schedule optimizing device of the first embodiment.

The structure of the operation schedule optimizing device 4 will be explained with reference to FIG. 3. FIG. 3 is a block diagram illustrating the whole structure of the operation schedule optimizing device 4. The operation schedule optimizing device 4 includes an optimizing processor 40, a data obtainer 20, a setting parameter inputter 21, a process data memory 22, an optimized data memory 23, and a transmitter/receiver 24.

[3-1. Optimizing Processor]

The optimizing processor 40 includes an energy predicting block 10, a schedule optimizing block 11, an approval request determining block 12, a determination result transmitting block 13, a control information output block 14, and a start instructing block 15.

(1) Energy Predicting Block

The energy predicting block 10 is a processor that predicts consumed energy or supply energy in the control-target apparatus 2. As will be explained later, when "an operation schedule is recalculated on the day", the energy predicting block 10 corrects a predicted energy value based on process data stored in the process data memory 22.

(2) Schedule Optimizing Block

The schedule optimizing block 11 is a processor that optimizes the operation schedule so as to minimize the evaluation barometer of the control-target apparatus 2. An example evaluation barometer in this embodiment is a cost necessary when the control-target apparatus 2 is actuated.

The schedule optimizing block 11 optimizes an object function and a variable of a constraint condition formula so as to minimize the object function based on the predicted energy value by the energy predicting block 10. In addition, when the operation schedule in accordance with the DR is optimized, the schedule optimizing block 11 adds an incentive unit price to the unit price of electricity rate at the DR target time.

(3) Approval Request Determining Block

The approval request determining block 12 is a processor that determines, for an approval of the operation schedule calculated by the schedule optimizer 11, whether or not it is necessary to request the facility operator an approval. The approval request determining block 12 performs determination based on a rule set in advance by the facility operator.

(4) Determination Result Transmitting Block

The determination result transmitting block 13 is means to transmit the determination result by the approval request determining block 12 to the facility operator. The determination result transmitting block 13 displays the determination result and a reason when an approval is necessary. The determination result transmitting block 13 is to transmit the determination result to the facility operator through any way, and how to transmit is optional. In the case of FIG. 3, the determination result transmitting block 13 is a personal computer terminal including a display, but the determination result can be transmitted through, for example, voice, or mail transmission.

(5) Control Information Output Block

The control information output block 14 is a processor that outputs control information to the control-target apparatus 2 upon approval by the facility operator for the operation schedule calculated by the schedule optimizing block 11.

(6) Start Instructing Block

The start instructing block 15 is a processor that starts executing an optimizing process by the optimizing processor 40 at a preset timing. When, for example, electricity/heat storing schedule on a day before the execution day is set, a predetermined time in each day can be set as a set timing. The days of this cycle and the hour of this timing can be freely set. Conversely, when the electricity/heat storing schedule is set on the day that is the execution day, the execution of the optimizing process is started at a certain time cycle based on a process cycle that is a setting parameter.

[3-2. Data Obtainer]

The data obtainer 20 is a processor that obtains necessary data for the process by the optimizing processor 40 from the exterior. Example data to be obtained are the aforementioned incentive unit price, process data, DR target time, and base line.

[3-3. Setting Parameter Inputted]

The setting parameter inputter 21 is a processor to input setting parameters necessary for the process by the optimizing processor 40. Example setting parameters are the aforementioned process timing, weight coefficient, evaluation barometer, device characteristic, and process cycle.

[3-4. Process Data Memory]

The process data memory 22 is a processor that stores necessary data for the process by the optimizing processor 40, and stores various data obtained through the data obtainer 20 and the setting parameter inputter 21.

[3-5. Optimized Data Memory]

The optimized data memory 23 is a processor that stores required data obtained through the optimizing process by the optimized processor 40. For example, the optimized data memory 23 stores an operation schedule optimized by the schedule optimizing block 11 and various data utilized for optimization.

[3-6. Transmitter/Receiver]

The transmitter/receiver 24 is a processor that exchanges information between the operation schedule optimizing device 4 and the local control device 3, the terminal of a building manager, an upper monitoring/controlling device, and a server device, etc., that provides weather information, etc., through the network N1 (illustrated in FIG. 1). When data stored in the process data memory 22 and the optimized data memory 23 is transmitted by the transmitter/receiver 24, the above-explained external devices become available.

The operation schedule optimizing device 4 includes an input device to input necessary information for the processes by the respective units, and to input selection of a process and an instruction, an interface for information input, and an output device that outputs a process result, etc. The input device includes input devices available currently or in future, such as a keyboard, a mouse, a touch panel, and a switch.

The input device can also function as the aforementioned data obtainer 20 and setting parameter inputter 21. The output device includes all output devices available currently or in future, such as a display device, and a printer device. When the output device displays data stored in the process data memory 22 and the optimized data memory 23, the operator can view the data.

[4. Operation of Operation Schedule Optimizing Device]

An operation of the operation schedule optimizing device 4 of this embodiment will be explained with reference to FIGS. 2 and 4.

[4-1. Flow of Energy]

First, flows of electricity, gas, cold water, and hot water in the control-target apparatuses 2 will be explained with reference to FIG. 2. That is, power received from power system is stored in the battery 100 or supplied to the above-explained energy consuming device. The power generated by the PV 101 and the CGS 102 is also stored in the battery 100 or supplied to the above-explained energy consuming device. The electricity supplied to the energy consuming device is consumed for producing heat by the electric refrigerator 103.

Conversely, the gas from a gas supply system is supplied to the CGS 102 and the absorption water cooler/heater 104. The absorption water cooler/heater 104 can produce cold heat by hot heat produced by the CGS 102. In addition, the absorption water cooler/heater 104 can increase the producing quantity of cold heat upon loading of gas.

The absorption water cooler/heater 104 can supply hot heat upon loading of gas only. The cold heat produced by the electric refrigerator 103 and the absorption water cooler/heater 104 is stored in the heat storage tank 105 or supplied to the air conditioner 111 installed in the room 110. The air conditioner 111 performs air conditioning on the room 110 by the supplied cold heat. In addition, the air conditioner 111 can perform heating upon supply of hot water produced either one of the CGS 102 and the absorption water cooler/heater 104.

[4-2. Relationship Between Quantity of Power Usage and Base Line]

In this case, a relationship among the quantity of power usage in the building 1 when the incentive type DR is applied, the base line, the DR target time at which power suppression is requested, and the quantity of power reduction will be explained with reference to FIG. 4. FIG. 4 illustrates a transition in the quantity of power usage in a day in the building 1. The horizontal axis represents a time in a day, while the vertical axis represents the quantity of power usage in the building 1.

As explained above, the base line is set based on the actual value of past power demand (quantity of consumed power) in the target building 1, a factory, etc. For example, the maximum quantity of power usage in a DR target time for several days, several weeks or a month can be set as a base line. However, how to set the base line is not limited to this example.

Figure 4:
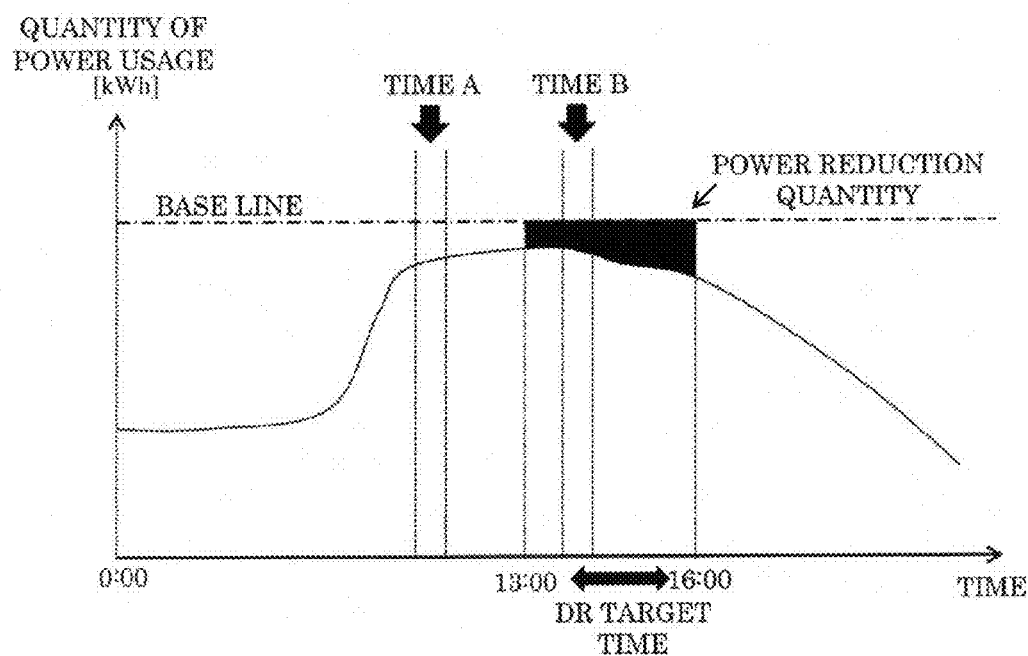
FIG. 4 is a graph illustrating a relationship among a quantity of power usage by a building 1, a base line, a DR target time at which power reduction is required, and a quantity of power reduction when an incentive type DR is applied according to the first embodiment.

As is indicated in the example of FIG. 4 with hatched portion, in the DR target time (in this example, 13:00 to 16:00), the quantity of power reduction is equivalent to the quantity of power usage reduced relative to the set base line. In FIG. 4, a time A is not the DR target time, and thus even if the quantity of power usage is lower than the base line, no incentive is given. Conversely, a time B is the DR target time, and thus an incentive is given in accordance with the quantity of reduction relative to the base line. As an example of contract system including an incentive, the following PTR, L-PTR, and CCP are expected.

(1) PTR: Peak Time Rebate

The PTR is a contract system which pays an amount of money obtained by multiplying the above-explained quantity of power reduction by an incentive unit price to a consumer.

(2) L-PTR: Limited Peak Time Rebate

L-PTR is substantially same as PTR, but is a contract system having an upper limit for the incentive to be paid.

(3) CCP: Capacity Commitment Program

A contract system that only when the quantity of power reduction exceeds the preset target value in all times in the DR target time, a fixed amount of money in accordance with the base line and the target value is paid.

That is, it is not always true that the amount of money simply proportional to the quantity of power reduction is an incentive, and an upper limit is set in some cases. Those are merely examples, and it is not true that in general, only those schemes are actually established or to be applied. In an actual application, various different schemes are applicable.

[4-3. Process when Operation Schedule for Next Day is Optimized a Day Before]

A process procedure of the operation schedule optimizing device 4 will be explained with reference to the flowchart of FIG. 5. The process explained below is an example of optimizing the next day's operation schedule of the control-target apparatus 2 in the building 1 the night before. The operation schedule to be optimized is for a future predetermined time period, and such a time period is not limited to the next day, and can be also a day after the next day.

[4-3. Optimization Executing and Starting Process]

First, the start instructing block 15 instructs an execution of the optimizing process at a preset time. When, for example, it becomes 21:00 in the day before, the optimizing processor 40 starts executing the optimizing process. The flowchart in FIG. 5 illustrates a process flow after the execution of the optimizing process is started upon instruction by the start instructing block 16.

[4-4. Energy Predicting Process]

The energy predicting block 10 predicts (step S1 in FIG. 5) the consumed energy or supply energy of the control-target apparatus 2 based on weather data and operation data within the past predetermined time period stored in the process data memory 22.

In this case, an explanation will be given of an example predicting process by the energy predicting block 10. First, based on the past day of week, weather, temperature, and humidity, etc., stored in the process data memory 22 as weather data and operation data, a similarity is calculated. An example similarity calculating formula is the following formula (1).

[Formula 1]

$$\text{SIMILARITY} = |\text{WEIGHT BASED ON DAY OF WEEK}| + |\text{WEIGHT BASED ON WEATHER}| + a \times |\text{THE HIGHEST TEMPERATURE OF THE NEXT DAY} - TM_i| + b \times |\text{THE LOWEST TEMPERATURE OF THE NEXT DAY} - TL_i| + c \times |\text{THE RELATIVE HUMIDITY OF THE NEXT DAY} - RH_i| \to \min (i=1,2,3,\ldots,n-1,n) \quad \text{Formula 1}$$

In this case, a "weight based on day of week" applied is a weight coefficient set in advance for each day of week. Terms a, b, and c are weight coefficients of respective factors. Likewise, a "weight based on weather" applied is also a weight coefficient set in advance for each weather. When, for example, the next day is "Tuesday", the "weight based on day of week" is the weight coefficient set for "Tuesday". When the weather based on the next day's weather forecast is "sunny", the "weight based on weather" is the weight coefficient set for "sunny". The highest temperature, the lowest temperature, and the relative humidity of the next day are predicted values.

Next, as past weather data, the highest temperature $TM_i$, the lowest temperature $TL_i$, and the relative humidity $RH_i$ of each day recorded in association with the day number of the past day. The day number is a serial number allocated for the operation data stored in the process data memory 22 and the weather data associated therewith sorted day by day.

Setting of each weight is optional. When, for example, the weather based on the next day's weather forecast is "sunny", if the past data is "sunny", the weight coefficient becomes small, but if the past data is "rainy", the weight coefficient becomes large. The "weight based on weather", the "weight based on day of week", and the weight coefficients of respective factors that are a, b, and c, etc., can be input through the setting parameter inputter 21, and stored in the process data memory 22, and, ones in accordance with the prediction precision can be freely settable.

The similarity of the past day is calculated through the formula (1) as explained above. There are other similarity calculation methods, and thus this embodiment is not limited to the aforementioned scheme. Next, the day number having the similarity obtained as explained above becoming the minimum is extracted. Eventually, the consumed energy or supply energy of the control-target apparatus 2 in the date corresponding to the extracted day number is set as the energy predicted value of the next day.

[4-6. Schedule Optimizing Process]

<1. Normal Operation Schedule>

The schedule optimizing block 11 optimizes (step S2 in FIG. 5) the operation schedule of the device based on the predicted value by the energy predicting block 10. The object function to be minimized can be defined as the following formula (2), and the constraint condition formula can be defined as the following formulae (3) to (8). The constraint condition formulae (3) to (6) express the energy flow in FIG. 2. The formulae (7) and (8) are constraint formulae for the capacity of the control-target apparatus 2. Note that those formulations are also merely examples.

[Formula 2]

$$\sum_{t=1}^{24} [X1^t \cdot E_C^t + GAS^t \cdot GAS_C] \Rightarrow \min \qquad \text{Formula 2}$$

[Formula 3]

$$X1^t + E_{CGS} \cdot X6^t + E_{PV} + (X8^t - X8^{t+1}) = \frac{H_R}{COP_R} \cdot X5^t + E_{DEMAND}^t \qquad \text{Formula 3}$$

[Formula 4]

$$GAS^t = GAS_{CGS} \cdot X6^t + GAS_{ABR-CG} \cdot X3^t + GAS_{ABR-HG} \cdot X4^t \qquad \text{Formula 4}$$

[Formula 5]

$$H_{ABR-CH} \cdot X2^t + H_{ABR-CG} \cdot X3^t + H_R \cdot X5^t + (X7^t - X7^{t+1}) = HC_{DEMAND}^t \qquad \text{Formula 5}$$

[Formula 6]

$$H_{CGS} \cdot X6^t + H_{ABR-HG} \cdot X4^t > H_{ABR-IN} \cdot X2^t + HH_{DEMAND}^t \qquad \text{Formula 6}$$

[Formula 7]

$$|X7^t - X7^{t+1}| \leq FL_{Hs} \qquad \text{Formual 7}$$

[Formula 8]

$$|X8^t - X8^{t+1}| \leq FL_{Bat} \qquad \text{Formula 8}$$

$E_C$: Power coefficient
$GAS_C$: Gas coefficient
$E_{CGS}$: CGS rated power generation quantity
$E_{PV}$: Predicted PV power generation quantity
$H_R$: Electric refrigerator rated cooling quantity
$H_{ABR-CH}$: Absorption water cooler/heater rated cooling quantity (producing cold water and exhaust heat loaded)
$H_{ABR-CG}$: Absorption water cooler/heater rated cooling quantity (producing cold water and gas utilized)
$H_{ABR-HG}$: Absorption water cooler/heater rated heating quantity (producing hot water and gas utilized)
$H_{ABR-IN}$: Absorption water cooler/heater rated exhaust heat loaded quantity
$COP_R$: Electric refrigerator COP
GAS: Quantity of gas usage
$GAS_{CGS}$: CGS rated quantity of gas usage
$GAS_{ABR-CG}$: Absorption water cooler/heater rated quantity of gas usage (producing cold water)
$GAS_{ABR-HG}$: Absorption water cooler/heater rated quantity of gas usage (producing hot water)
$E_{DEMAND}$: Predicted power consumption energy
$HC_{DEMAND}$: Predicted cold water consumption energy
$HH_{DEMAND}$: Predicted hot water consumption energy
$FL_{Hs}$: Maximum quantity of storing (dissipating) heat of heat storage tank
$FL_{Bat}$: Maximum charging (discharging) quantity of battery In this case, the superscript letter t of variables, etc., in the formulae (3) to (8) indicates a time. When variables X1 to X8 that minimizes the formula (2) are obtained from the formulae (3) to (8), the optimization is enabled. FIG. 6 illustrates example variables X1 to X8 for optimization. X1 is a quantity of power usage, and X2 to X6 are loading factors of the control-target apparatuses 2. X7 is a remaining quantity of heat by the heat storage tank, and X8 is an SOC (State Of Charge) of the battery. $X7^0$ and $X8^0$ are initial conditions, and are given as setting parameters.

The power coefficient and the gas coefficient both in the formula (2) vary depending on the object to be optimized. In the case of, for example, cost minimization, those become the unit price of electricity rate, and the unit price of gas rate, and in the case of $CO_2$ minimization, those become the $CO_2$ emission quantity or the coefficient corresponding thereto. The formulae (3) to (8) are major constraint condition formulae, and variables that minimize the optimization barometer while satisfying those are obtained through a mathematical programming scheme or a repeated calculation based on a simulation.

<2. Operation Schedule in Accordance with DR>

Next, the schedule optimizing block 11 optimizes the operation schedule in consideration of the incentive by the DR. At this time, when the evaluation barometer is a cost, the power coefficient $EC^t$ [JP YEN/kWh] is converted into the following formula (9), and the upper limit of the quantity of power usage X1 at this time is changed to the base line.

The term $E_{CHG}^t$ [JP YEN/kWh] in the formula (9) is a unit price of metered electricity rate at the time t, and $INC^t$ [JP YEN/kWh] is an incentive unit price at the time t. Hence, the incentive unit price is considered in the electricity rate.

[Formula 9]

$$E_C^t = E_{CHG}^t + INC^t \qquad \text{Formula 9}$$

<3. Selection of Adopted Schedule>

Eventually, in the schedule optimizing block 11, the operation schedule to be adopted between "1. normal operation schedule" and "2. operation schedule in accordance with DR" obtained through the above-explained scheme is selected. As to this determination, a total evaluation barometer value in a day in each schedule may be calculated to automatically select either smaller one, or the schedule may be selected by the facility operator.

[4-7. Approval Request Determining Process]

The approval request determining block 12 determines (step S3 in FIG. 5) whether or not to request the facility operator to approve the operation schedule of the device calculated by the schedule optimizing block 11. In addition, the case of the "process of optimizing the next day's operation schedule on the day before" is a case in which a periodic optimizing process executed at a predetermined process timing, e.g., for each day, or is the optimizing process forcibly executed upon request made by the facility operator, and the approval request determining block 12 always requests the facility operator to approve the operation schedule in such a case.

[4-8. Determination Result Transmitting Process]

Figure 7:
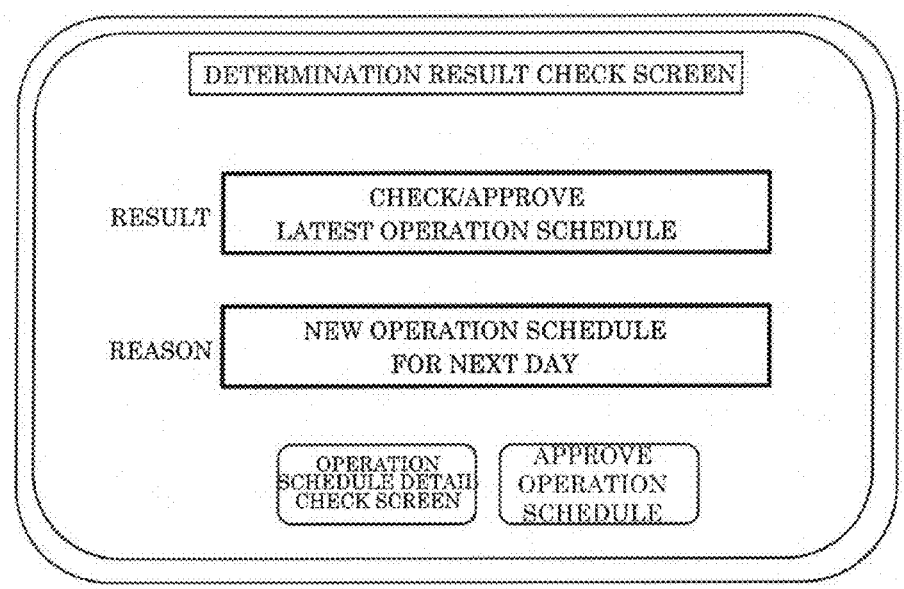
FIG. 7 is a diagram illustrating an example display requesting an approval of an operation schedule to a facility operator in the first embodiment.

The determination result transmitting block 13 transmits (step S4 in FIG. 5) the determination result by the approval request determining block 12 and the reason of the determination result to the facility operator. In the case of the "process of optimizing the next day's operation schedule on the day before", the approval of the operation schedule is always requested to the facility operator. When the determination result transmission is carried out through the display of a personal computer, FIG. 7 illustrates an example display screen. In the determination result check screen illustrated in FIG. 7, a determination result and a reason thereof are displayed, and an "operation schedule detail check screen" button and an "approve operation schedule" button are displayed below the reason.

In addition, together with the display of such a screen, an alarm, etc., may be provided when, for example, requesting an approval. The determination result and the reason of the determination result are transmitted to the facility operator in this way, and thus the facility operator can understand that it is necessary to check the operation schedule or to approve the operation schedule, and can review the reason when an approval is necessary.

[4-9. Control Information Output]

Eventually, the control information output block 14 outputs (step S5 in FIG. 5) the control information based on the operation schedule including a control setting value to the control-target apparatus 2. Various output timings of the control information are possible. For example, the output timing can be set as the day before a day when the operation schedule is executed, and the control setting value received by each local control device 3 is stored. Next, each local control device 3 performs control based on the control information on the execution day. In addition, the current day when the operation schedule is executed can be set as an output timing.

Values calculated out through the successive processes including the obtained operation schedule are stored in the optimized data memory 23. The above-explained operations are the operation flow of the operation schedule optimizing device 4 when the next day's operation schedule is optimized the day before. The evaluation barometer to be minimized can be other barometers than a cost. For example, $CO_2$, the peak power receiving quantity, and energy consumption can be the evaluation barometers to be minimized. In addition, a composite barometer that is a combination of those barometers can be applied.

[4-10. When Schedule is Changed on Current Day]

The control-target apparatus 2 is actually operated in the next day based on the operation schedule optimized the night before as explained above. In this case, the process flow of the operation schedule optimizing device 4 when the schedule is updated in the current day when the control-target apparatus 2 is being operated is the same as the flowchart of FIG. 5.

[4-11. Optimization Executing and Starting Process]

The start instructing block 15 instructs execution of the optimizing process for each preset cycle. When, for example, the process cycle of the setting parameter is 10 minutes, the start instructing block instructs execution of the optimizing process for each 10 minutes.

[4-12. Energy Predicting Process]

Figure 8:
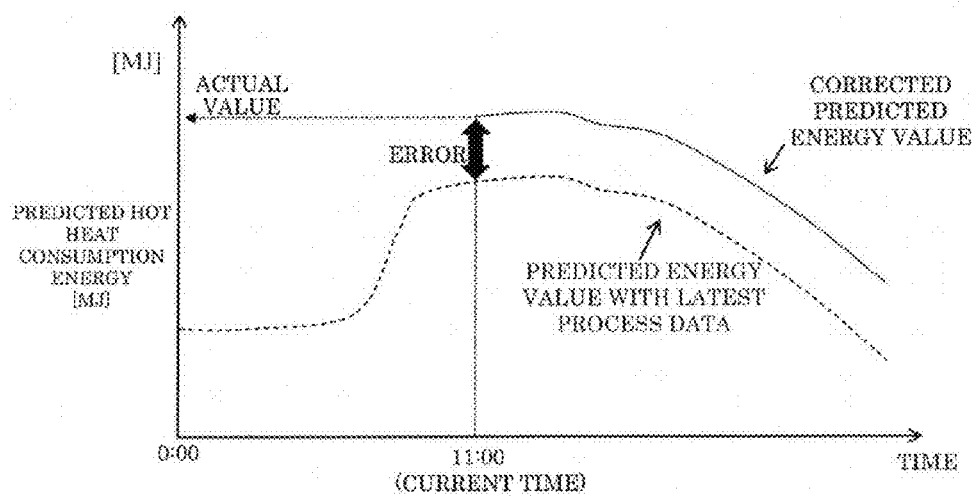
FIG. 8 is a graph illustrating a predicted heat consumption energy of the first embodiment with a trend in a day.

The energy predicting block 10 sets the predicted energy value at first like the case of the "process of optimizing the next day's operation schedule the day before" using the latest process data. Next, an error ERR between the latest actual value of the predicted energy value that is the process data and the predicted energy value at the current time is calculated, and the predicted energy value is corrected (step S1 in FIG. 5) based on the following formula (10). The predicted energy value corrected in this way is indicated in FIG. 8. FIG. 8 illustrates the predicted hot heat consumption energy with a trend in a day, and the dashed line in the figure indicates the predicted energy value set using the latest process data.

[Formula 10]

$$E_{PRED\_NEW}^{t}=E_{PRED\_OLD}^{t}+ERR(t=\text{CURRENT TIME}, \text{CURRENT TIME}+1,\ldots,\text{CURRENT TIME}+n)$$ Formula 10

$E_{PRED\_NEW}^{t}$: CORRECTED PREDICTED ENERGY VALUE $E_{PRED\_OLD}^{t}$: PREDICTED ENERGY VALUE SET BASED ON THE LATEST PROCESS DATA

ERR: ERROR

Since the current value of the hot heat consumption energy is stored as process data in the process data memory 22 through the data obtainer 20, a difference between the current value and the predicted energy value is taken as an error, and the predicted energy value is corrected. The way of correction explained above is merely an example, and the predicted energy value can be corrected through other ways.

[4-13. Schedule Optimizing Process]

The operation schedule after the current time for the control-target apparatus 2 is optimized (step S2 in FIG. 5) based on the predicted energy value re-set by the energy predicting block 10. In this case, the remaining quantity of heat stored by the heat storage tank 105, and the SOC initial conditions $X7^0$ and $X8^0$ of the battery 100 are set to the current SOC of the battery 100 and the current remaining quantity of the heat stored in the heat storage tank 105 in the process data. In addition, when a breakdown of the control-target apparatus 2 is stored in the process data, the respective upper limits of the variables X2 to X8 for the corresponding device in FIG. 6 are set to zero. The detail of the following process contents are the same as those of the case of the "process of optimizing the next day's operation schedule the day before", thus omitted.

[4-14. Approval Request Determining Process]

Figure 9:
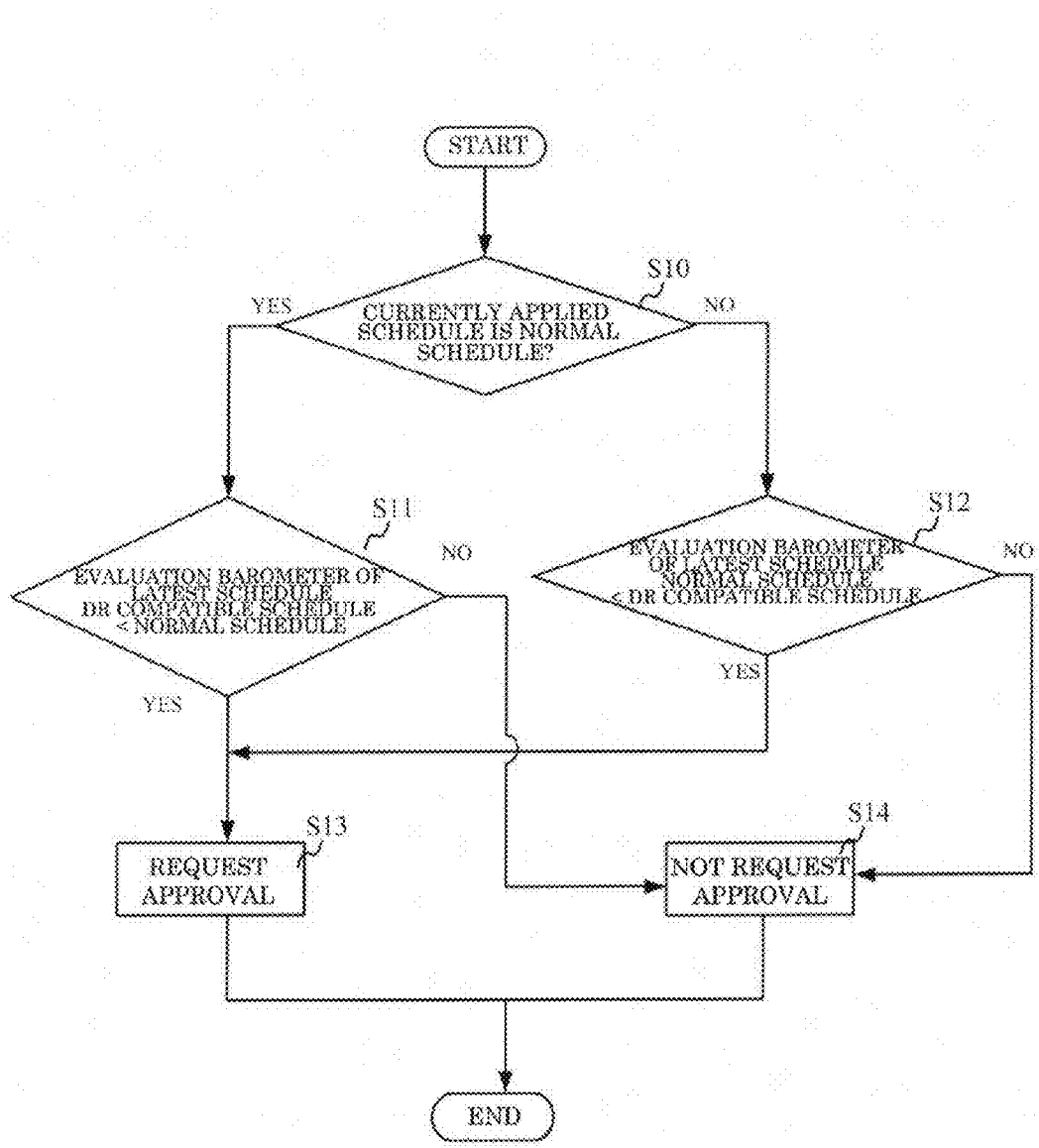
FIG. 9 is a flowchart illustrating a determining process of the first embodiment.

The approval request determining block 12 determines (step S3 in FIG. 5) whether or not to request the facility operator to approve the latest operation schedule of the device calculated by the schedule optimizing block 11. The schedule optimizing block 11 calculates the normal operation schedule and the operation schedule in accordance with the DR. The approval request determining block 12 determines whether or not to request the facility operator to approve the latest operation schedule using those two kinds of operation schedules. FIG. 9 illustrates the determining process flow. In the following explanation, the determining process by the approval request determining block 12 will be mentioned.

First, it is determined (step S10) which one of the above-explained two kinds of operation schedules is the operation schedule currently applied. When the currently applied operation schedule is the normal operation schedule (step S10: YES), the evaluation barometers in the two kinds of latest operation schedules are calculated, and it is determined (step S11) whether or not the DR associated schedule has the smaller evaluation barometer.

When the DR applied schedule has the smaller evaluation barometer (step S11: YES), the facility operator is request to approve the latest schedule (step S13). Conversely, when the DR applied schedule has the larger evaluation barometer (step S11: NO), an approval of the operation schedule is not requested (step S14).

On the other hand, when the currently applied schedule is the DR applied schedule (step S10: NO), the evaluation barometers of the two kinds of latest operation schedules are likewise calculated, and it is determined (step S12) whether or not the normal operation schedule has the smaller evaluation barometer. When the normal operation schedule has the smaller evaluation barometer (step S12: YES), the process progresses to step S13, and an approval of the operation schedule is requested.

Conversely, when the normal operation schedule has the larger evaluation barometer (step S12: NO), the process progresses to step S14, and an approval of the operation schedule is not requested. Through the above-explained determining process, the approval request determining block 12 determines whether or not to request the facility operator to approve the latest operation schedule of the device calculated by the schedule optimizing block 11.

[4-15. Determination Result Transmitting Process]

Figure 10:
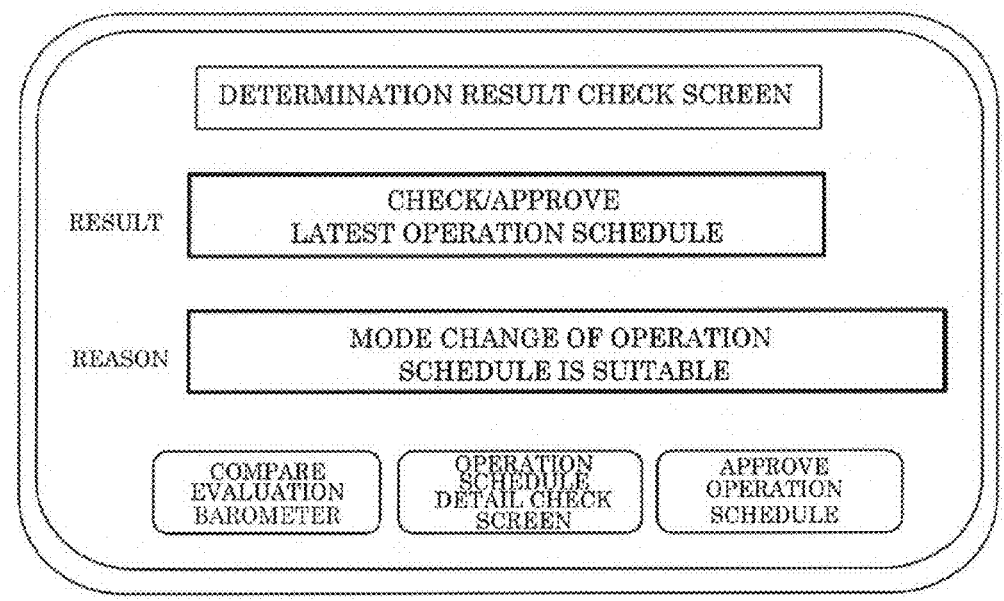
FIG. 10 is a diagram illustrating an example screen of the first embodiment to request an approval.

The determination result transmitting block 13 transmits (step S4 in FIG. 5) the determination result by the approval request determining block 12 and the reason of the determination result to the facility operator. FIG. 10 illustrates an example screen to request an approval. In the determination result check screen illustrated in FIG. 10, the determination result, the reason thereof, an "operation schedule detail check screen" button, and an "approve operation schedule" button are displayed, and a "compare evaluation barometers" button is displayed at the left of the "operation schedule detail check screen" button in the screen.

Figure 11:
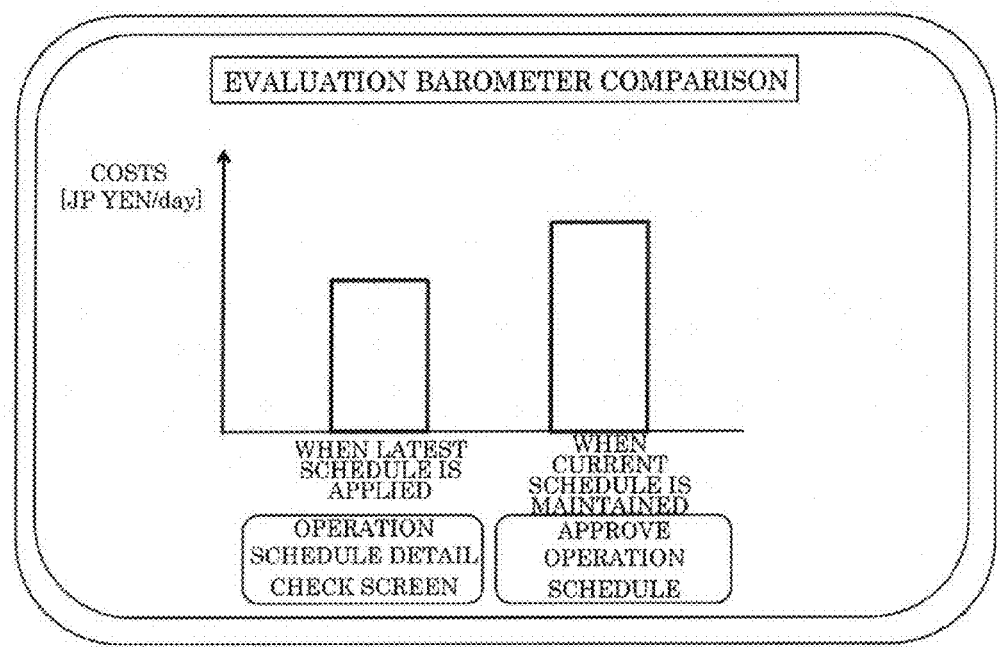
FIG. 11 is a diagram illustrating an example screen developed when a "compare evaluation barometer values" button in FIG. 10 is depressed.

FIG. 11 is an example screen developed when the "compare evaluation barometers" button in FIG. 10 is depressed. In the example case in FIG. 11, when the evaluation barometer "cost" is set, respective costs when the current schedule is maintained and when the latest schedule is reflected are shown. The facility operator can check the effect of schedule update by viewing this screen.

Figure 12:
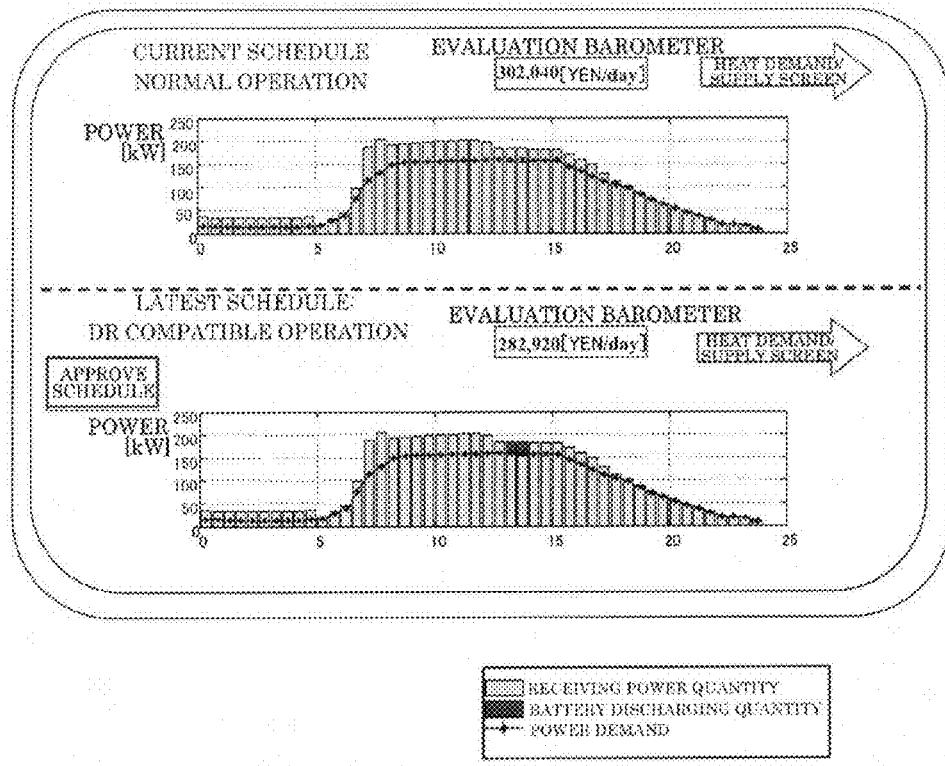
FIG. 12 is a diagram illustrating an example screen developed when a "detail check screen for operation schedule" button in FIG. 10 is depressed.
Figure 13:
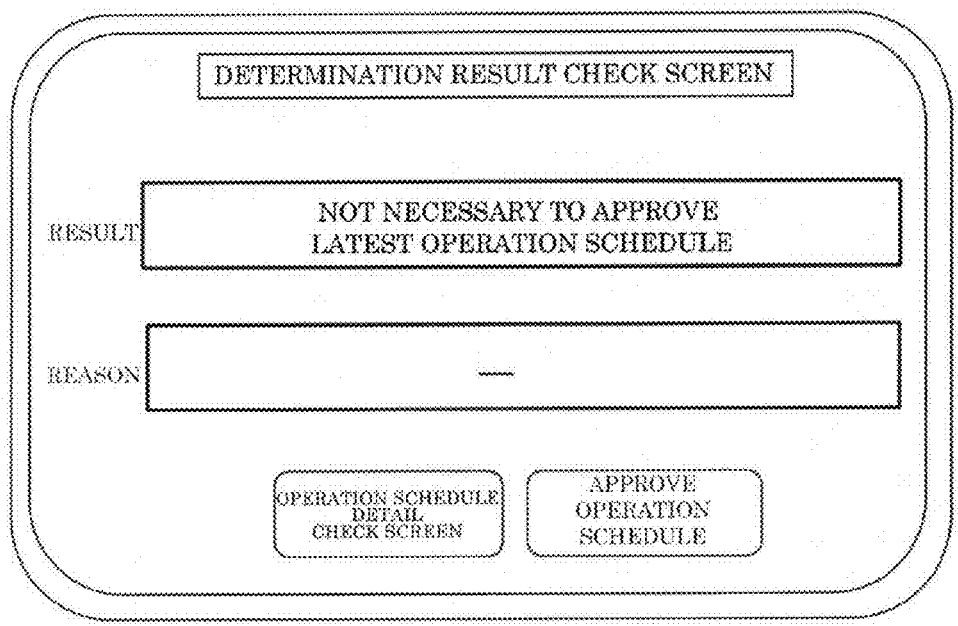
FIG. 13 is a diagram illustrating an example screen of the first embodiment when no approval request is made.

In addition, FIG. 12 illustrates an example screen developed when the "operation schedule detail check screen" button in the lower part of FIG. 10 is depressed. In FIG. 12, the trend of the current operation schedule and the operation mode are displayed on the upper part, while the trend of the latest operation schedule and the operation mode are displayed on the lower part. The facility operator can check the difference of the operation schedule before and after the schedule update by viewing this screen. Conversely, FIG. 13 illustrates an example screen when no approval is requested. In the determination result check screen in FIG. 13, although the determination result is displayed, the reason thereof is not displayed since no approval is requested. It is not illustrated in FIG. 13 but the reason why no approval is requested may be displayed with messages like "normal operation schedule should be maintained".

[4-16. Control Information Output]

Eventually, the control information output block 15 outputs (step S6 in FIG. 5) the control information based on the operation schedule after the current time including the set control value to the control-target apparatus 2. The above-explained operation is the operation flow of the operation schedule optimizing device 4 when the operation schedule is changed on the day.

[5. Advantageous Effects]

According to the first embodiment explained above, when, for example, the normal operation schedule is selected at the optimizing process performed the day before, and the control-target apparatus is operated in accordance with that schedule in the next day, if the evaluation barometer can be improved in accordance with the DR upon a sharp decrease of the quantity of power usage, this improvement is transmitted to the facility operator at this time point. Conversely, if it is preferable to maintain the normal operation schedule, such a determination can be also transmitted to the facility operator.

According to the above-explained first embodiment, the facility operator is caused to recognize the need of approval of the operation schedule only when it is necessary. Hence, the burden share to the facility operator can be maximally reduced, while the optimized operation of the control-target apparatus 2 can be ensured in accordance with the DR.

[B. Second Embodiment]

[1. Structure]

A second embodiment employs the same structure as that of the first embodiment.

[2. Operation]

The second embodiment basically employs the same operation as that of the first embodiment. The differences are the [approval request determining process] and the [determination result transmitting process] when "the schedule is changed on the day".

[2-1. Approval Request Determining Process]

FIG. 14 illustrates a determining process flow. In the following explanation, the determining process by the approval request determining block 12 will be mentioned. First, in the process data stored in the process data memory, a breakdown of the device is extracted and that device is determined (step S20 in FIG. 14).

Next, the operation schedule applied to the current operation of the control-target apparatus is extracted from the optimized data memory 23, and it is determined (step S21 in FIG. 14) whether or not the device in the breakdown condition is to be used in a future time. For example, this determination is carried out as follow.

[1] Based on the operation schedule extracted from the optimized data memory 23, a list of activated devices after the current time and illustrated in FIG. 15 is created. In FIG. 15, when the device is deactivated, it is indicated by zero, and when the device is activated, it is indicated by one.

[2] It is determined which device in the activated device list corresponds to the breakdown device (in the case of FIG. 15, a device C and a device D correspond).

[3] The operation status of the breakdown device is checked sequentially from the current time, and when all elements are indicated by zero, it is determined that the breakdown device will not be activated, and if even one element is indicated by one, it is determined that the breakdown device will be activated (step S21: YES in FIG. 14), and the process progresses to step S22. In the example case in FIG. 15, first, in the determination of the operation status of the device C, it is determined that "the breakdown device will not be activated", and at the end of the determination of the operation status of the device D at 18:00, it is determined that "the breakdown device will be activated".

Next, in step S22, the facility operator is requested to approve the latest operation schedule when the breakdown device will be activated. When the breakdown device will not be activated, no approval of the latest operation schedule is requested to the facility operator (step S23 in FIG. 14).

Through the above-explained determining process, the approval request determining block 12 determines whether or not to request the facility operator to approve the latest operation schedule of the device calculated by the schedule optimizing block 11. The latest operation schedule of the device in this case is an operation schedule calculated with the breakdown device being excluded.

[2-2. Determination Result Transmitting Process]

The determination result transmitting block 13 transmits the determination result by the approval request determining block 12 and the reason of the determination result to the facility operator. FIG. 16 illustrates an example screen to request an approval. In FIG. 16, a reason of the determination result that "device to be operated break down" is displayed. Even if the device breaks down, when the operation as scheduled is possible, a reason that no approval is requested such that the device in the breakdown condition will not be activated may be transmitted to the facility operator.

[3. Advantageous Effects]

According to the above-explained second embodiment, when the device breaks down and the operation as scheduled becomes difficult, an approval request for the latest operation schedule and the determination result for the approval request that is the breakdown of the device are transmitted to the facility operator. In addition, even if the device breaks down, when the operation as scheduled is possible, no approval for the latest operation schedule is requested. Hence, according to the second embodiment, as long as the operation as scheduled can be maintained although the device breaks down, the facility operator is not caused to approve the operation schedule. As a result, the work burden for the facility operator can be further reduced. In addition, when the device to be activated breaks down, an approval request for the latest operation schedule is transmitted to the facility operator, and thus the latest operation schedule can be surely approved by the facility operator. Hence, the optimized operation of the control-target apparatus 2 in accordance with the DR can be maintained.

[C. Third Embodiment]

[1. Structure]

A third embodiment employs the same structure as that of the first embodiment.

[2. Operation]

The third embodiment basically employs the same operation as that of the first embodiment. The differences are the [approval request determining process] and the [determination result transmitting process] when "the schedule is changed on the day" like the second embodiment.

[2-1. Approval Request Determining Process]

Figure 17:
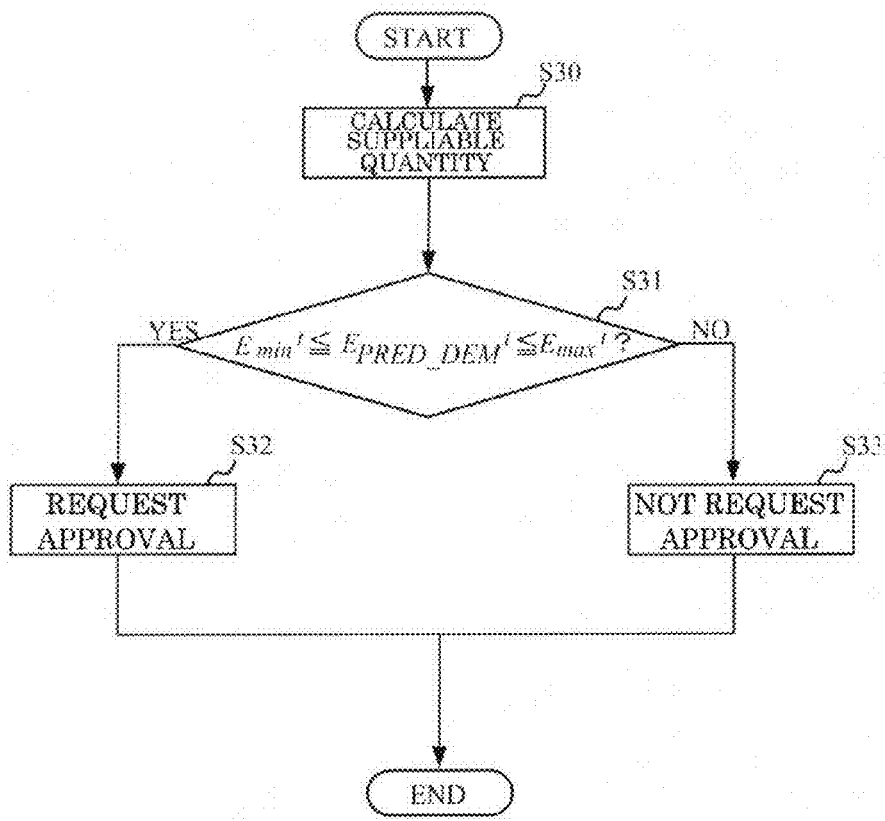
FIG. 17 is a flowchart illustrating a determining process according to a third embodiment.

FIG. 17 illustrates a determining process flow. In the following explanation, a determining process by the approval request determining block 12 will be mentioned. First, based on the currently applied operation schedule stored in the optimized data memory 23 and the predicted value of the energy supply quantity predicted by the energy predicting block 10, the maximum available supply quantity of energy and the minimum available supply quantity thereof at each time are calculated (step S30). The calculation of the available supply quantity is carried out through the following procedures.

[1] Based on the current operation schedule extracted from the optimized data memory 23, a list of activated devices after the current time is created (this procedure is the same as that of the second embodiment, see FIG. 15 for the activated device list).

[2] The maximum available supply quantity is calculated through the following formula (11).

[3] The minimum available supply quantity is calculated through the following formula (12).

[Formula 11]

$$E_{max}^t = \sum_{i=1}^{NUMBEROFDEVICE} (N_i^t \times CAP_i) + E_{PRED\_SUP}^t + E_{ST}^t \quad (t = \text{CURRENT TIME}, \text{CURRENT TIME} + 1, \ldots, \text{CURRENT TIME} + n)$$

[Formula 12]

$$E_{min}^t = \sum_{i=1}^{NUMBEROFDEVICE} (N_i^t \times LCAP_i) + E_{PRED\_SUP}^t + E_{ST}^t \quad (t = \text{CURRENT TIME}, \text{CURRENT TIME} + 1, \ldots, \text{CURRENT TIME} + n)$$

$E_{MAX}$: Maximum available supply quantity $N_i$: Operation status of device i (1: operated, 0: deactivated)

$CAP_i$: Maximum output by device i $E_{PRED\_SUP}$: Predicted value of energy supply quantity $E_{ST}$: Energy storing quantity or discharging quantity by energy storing device (−: store, +: discharge)

Next, the calculated available energy supply quantity and a predicted value $E_{PRED\_DEM}^t$ of the latest energy consumption quantity set by the energy predicting block 10 is compared (step S31). If the predicted value $E_{PRED\_DEM}^t$ of the energy consumption quantity is out of the range between the minimum available supply quantity $E_{min}^t$ and the maximum available supply quantity $E_{max}^t$ (step S31: YES), it is necessary to additionally activate/deactivate the device, and thus an approval for the latest operation schedule is requested (step S32). Conversely, when the predicted value $E_{PRED\_DEM}^t$ of the energy consumption quantity is within the range between the minimum available supply quantity $E_{min}^t$ and the maximum available supply quantity $E_{max}^t$ (step S31: NO), it is unnecessary to additionally activate/deactivate the device, and thus no approval for the latest schedule is requested (step S33).

Through the above-explained determining process, the approval request determining block 12 determines whether or not to request the facility operator to approve the latest operation schedule of the device calculated by the schedule optimizing block 11.

[2-2. Determination Result Transmitting Process]

Figure 18:
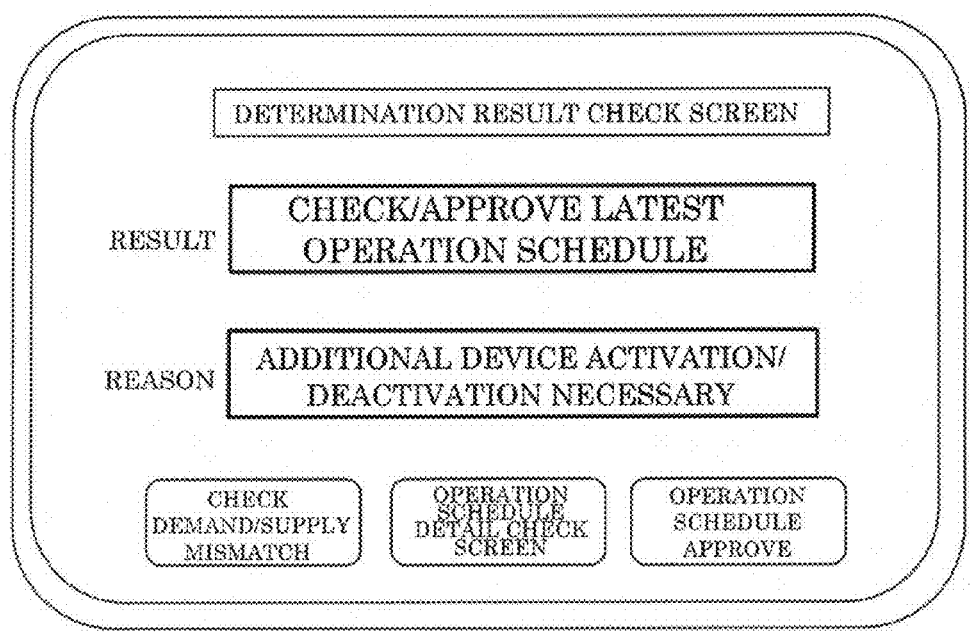
FIG. 18 is a diagram illustrating an example display to request an approval according to the third embodiment.

The determination result transmitting block 13 transmits the determination result by the approval request determining block 12 and the reason of the determination result to the facility operator. FIG. 18 illustrates an example screen to request an approval. In FIG. 18, the reason of the determination result that "it is necessary to additionally activate or deactivate the device" is displayed.

Figure 19:
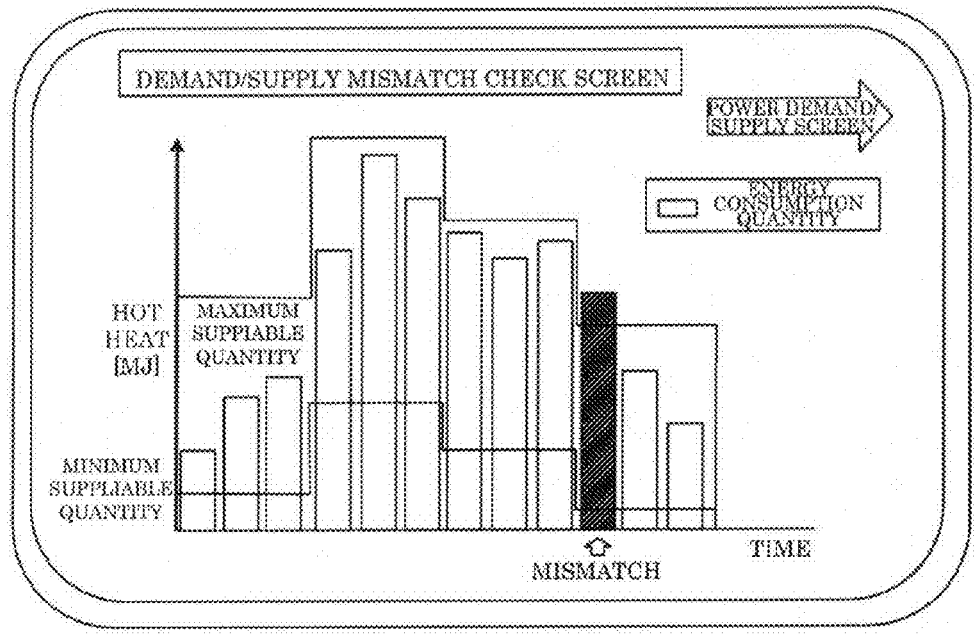
FIG. 19 is a diagram illustrating an example screen developed when a "check demand/supply error" button in FIG. 18 is depressed.

In addition, according to the example screen in FIG. 18, a "check demand/supply error" button is displayed at the bottom. FIG. 19 illustrates an example screen developed when this "check demand/supply error" button is depressed. According to the display in FIG. 19, the facility operator can view the above-explained predicted value of energy consumption quantity, minimum available supply quantity, maximum available supply quantity, the mismatching quantity of the energy demand/supply, and the mismatch occurring time at a glance. Even if the predicted value of the energy consumption quantity is slightly changed, when additional activation/deactivation of the device is unnecessary, the reason why no approval is requested such that the change in the predicted value does not affect the operation schedule may be transmitted to the facility operator.

In general, even if a slight mismatch occurs between the energy supply and demand, the control-target apparatus 2 alone or the local control device 3 operates so as to eliminate such a mismatch and such a control is often automatically performed. For example, according to a heat source device, the output by the device alone is controlled so as to compensate the cold/hot water temperature at the outlet. Hence, in comparison with the device output in the previous operation schedule, even if the actual device output is slightly changed, the aforementioned adjusting mechanism works out if such a change is within the operation range of the device, and thus there is no problem in the facility operation.

[3. Advantageous Effects]

According to the third embodiment, only when additional activation/deactivation of the device is necessary due to a change, etc., in the predicted value of the energy consumption quantity, an approval request for the latest operation schedule is transmitted to the facility operator, and when additional activation/deactivation of the device is unnecessary even if a slight change occurs, no approval request for the latest operation schedule is transmitted to the facility operator.

Hence, according to the third embodiment, when it becomes necessary to additionally activate or deactivate the device, an approval request for the latest operation schedule is transmitted to the facility operator. Hence, the latest operation schedule can be surely approved by the facility operator, and the optimized operation of the control-target apparatus 2 in accordance with the DR can be ensured while reducing the work burden of the facility operator.

[D. Fourth Embodiment]

[1. Structure]

A fourth embodiment employs the same structure as that of the first embodiment.

[2. Operation]

The fourth embodiment basically employs the same operation as that of the first embodiment. The differences are only the [approval request determining process] and the [determination result transmitting process] when "the schedule is changed on the day" like the second and third embodiments.

[2-1. Approval Request Determining Process]

Figure 20:
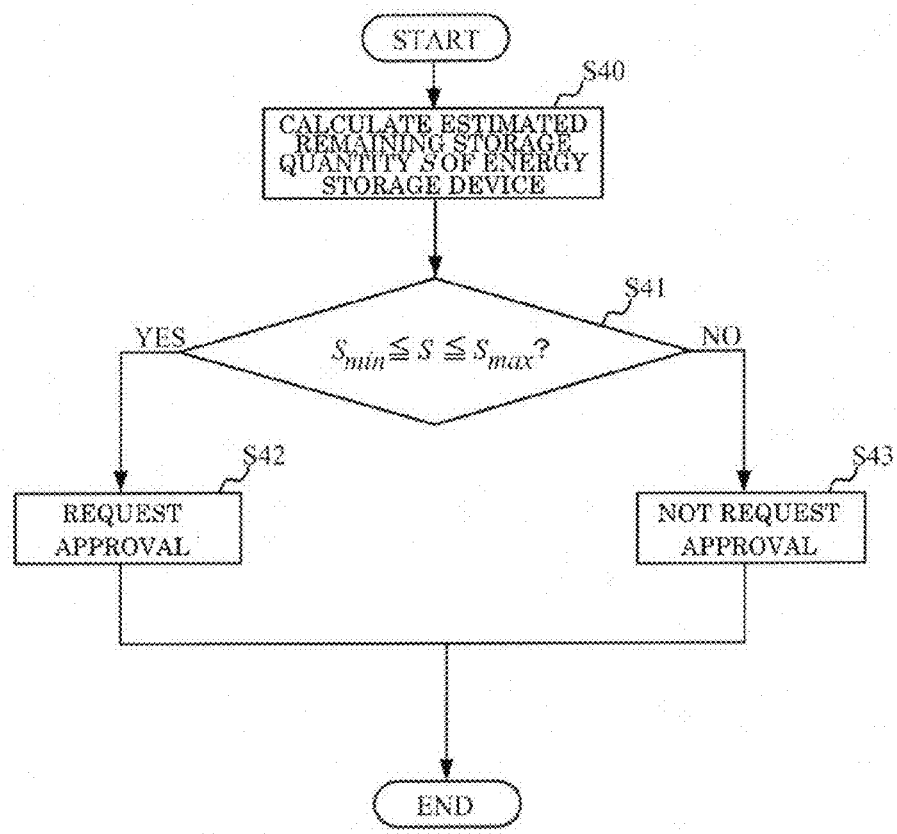
FIG. 20 is a flowchart illustrating a determining process according to a fourth embodiment.

FIG. 20 illustrates a determining process flow. In the following explanation, the determining process by the approval request determining block 12 will be mentioned. First, based on an energy storage quantity or discharging quantity $E_{ST}$ of the energy storage device in the currently applied operation schedule stored in the optimized data memory 23, and a remaining storage quantity $S_{PV}$ of the current energy storage device stored in the process data memory 22, an estimated remaining storage quantity S after the current time is calculated (step S40). The estimated remaining storage quantity S can be calculated through the following formula (13).

[Formula 13]

$$S^{t+1} = S_{PV} + E_{ST}^t \quad (t=\text{CURRENT TIME, CURRENT TIME}+1, \ldots, \text{CURRENT TIME}+n) \quad \text{Formula 13}$$

$S_{PV}$: Current remaining storage quantity of energy storage device $E_{ST}$: Energy storing quantity or discharging quantity of energy storage device (−: store, +: discharge)

Next, it is evaluated (step S41) whether or not the calculated estimated remaining storage quantity S is within a range between a minimum remaining storage quantity $S_{min}$ and a maximum remaining storage quantity $S_{max}$ defined based on the characteristic of the energy storage device. When the estimated remaining storage quantity S is out of a range between the minimum remaining storage quantity $S_{min}$ and the maximum remaining storage quantity $S_{max}$ (step S41: YES), an approval for the latest operation schedule is requested (step S42). Conversely, when the estimated remaining storage quantity S is within a range between the minimum remaining storage quantity $S_{min}$, and the maximum remaining storage quantity $S_{max}$ (step S41: NO), no approval for the latest operation schedule is requested (step S43).

Through the above-explained determining process, the approval request determining block 12 determines whether or not to request the facility operator to approve the latest operation schedule of the device calculated by the schedule optimizing block 11.

[2-2. Determination Result Transmitting Process]

Figure 21:
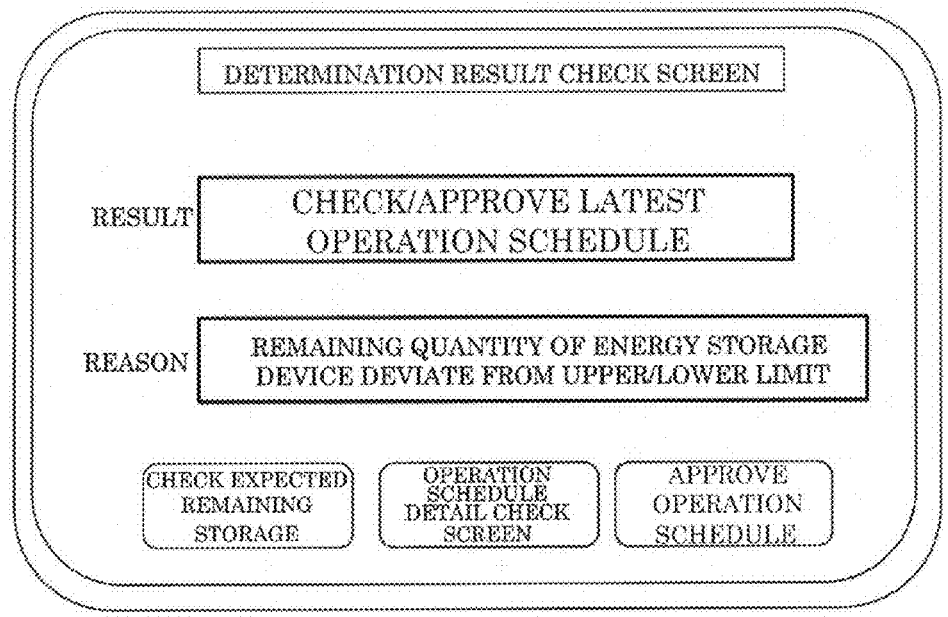
FIG. 21 is a diagram illustrating an example display to request an approval according to the fourth embodiment.

The determination result transmitting block 13 transmits the determination result by the approval request determining block 12 and the reason of the determination result to the facility operator. FIG. 21 illustrates an example screen to request an approval. In FIG. 21, as the determination reason for an approval request, "remaining quantity of energy storage device becomes out of range between upper and lower limits" is displayed.

Figure 22:
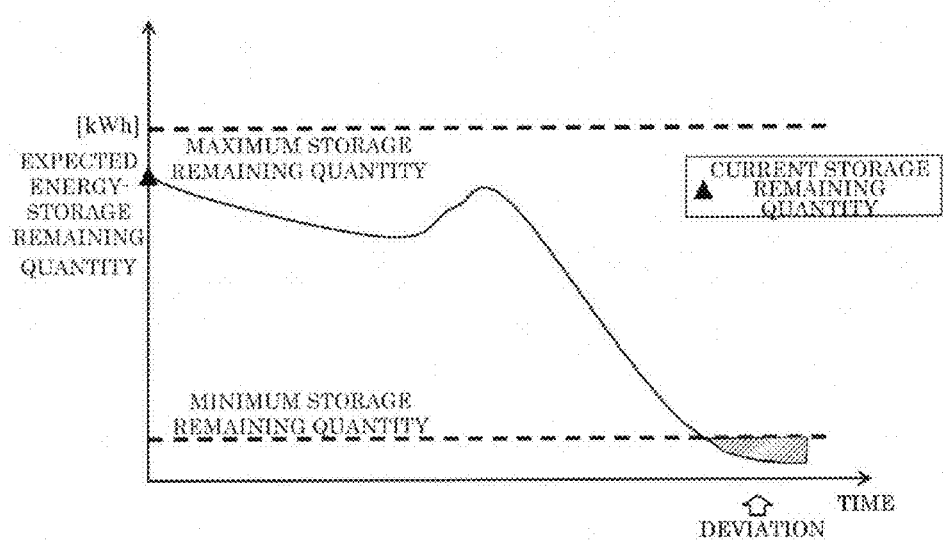
FIG. 22 is a diagram illustrating an example screen developed when a "check expected remaining storage level" in FIG. 21 is depressed.

In addition, according to the example screen in FIG. 21, a "check expected remaining storage quantity" button is displayed at the lower part. FIG. 22 illustrates an example screen developed when this "check expected remaining storage quantity" button is depressed. According to the display in FIG. 22, the facility operator can view the expected remaining storage quantity of the energy storage device, the minimum remaining storage quantity, the maximum remaining storage quantity, and from which one of the minimum remaining storage quantity and the maximum remaining storage quantity the expected remaining storage quantity deviates, and how much the expected remaining storage quantity deviates at a glance. At this time, even if the remaining stored energy quantity is slightly changed, when such a change is within a range that can maintain the operation, a message or the like to the effect that such a change does not affect the operation may be transmitted to the facility operator.

According to normal devices, in view of a suppression of breakdown and aging, the operation range that must be maintained for the operation is defined by the upper and lower limits. When the operation schedule of the control-target apparatus 2 is optimized, it is typical to set the upper and lower limits stricter than the upper and lower limits on the device characteristic. According to such a setting, even if a slight error occurs in an actual device operation, such a change is prevented from deviating from the operation range that must be maintained for the operation.

[3. Advantageous Effect]

According to the fourth embodiment, only when the remaining stored energy quantity is likely to deviate from the range that must be maintained for the operation, an approval request for the latest operation schedule is transmitted to the facility operator. In addition, even if the remaining stored energy quantity slightly changes, when such a change is within the range that must be maintained for the operation, no approval request for the latest operation schedule is transmitted to the facility operator. Hence, it is unnecessary for the facility operator to excessively pay attention to the remaining stored energy quantity, and thus the work burden can be reduced.

When the remaining stored energy quantity deviates from the upper or lower limit, a message, etc., to the effect is transmitted to the facility operator, and the facility operator is recognized the need for approving the operation schedule. As a result, the latest operation schedule can be surely approved by the facility operator, and the optimized operation of the control-target apparatus 2 in accordance with the DR can be ensured.

[E. Fifth Embodiment]

[1. Structure]

Figure 23:
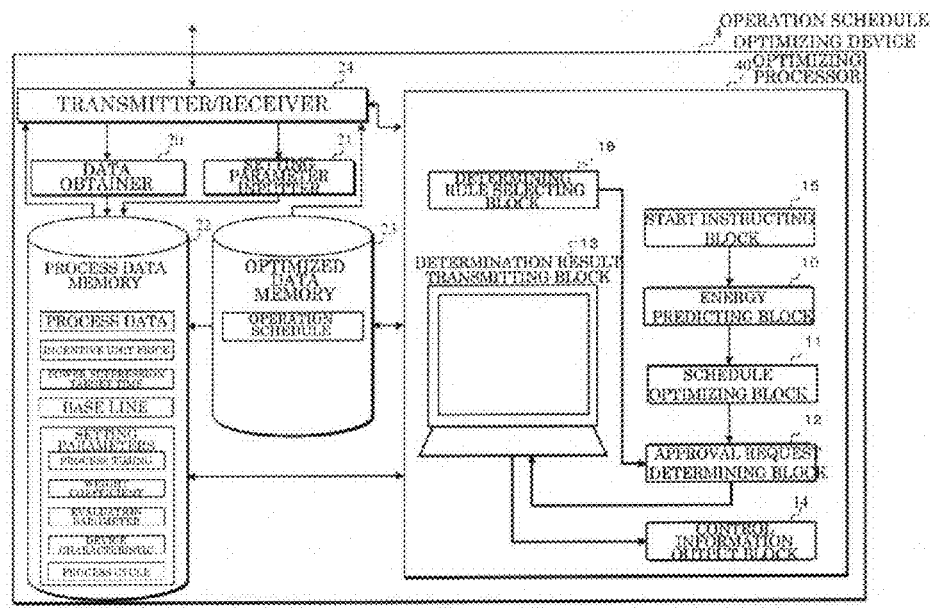
FIG. 23 is a block diagram illustrating a whole structure of an operation schedule optimizing device according to a fifth embodiment.

FIG. 23 illustrates a structure according to a fifth embodiment. FIG. 23 is a block diagram illustrating a whole structure of the operation schedule optimizing device 4 of the fifth embodiment. The difference between the structure of the fifth embodiment and those of the first to third embodiments is that a determining rule selecting block 16 is added which allows the facility operator to freely select a determining rule of the approval request determining block 12.

[2. Operation]

This embodiment basically employs the same operation as that of the first embodiment. The difference is that a [determining rule selecting process] is added.

[2-1. Determining Rule Selecting Process]

Figure 24:
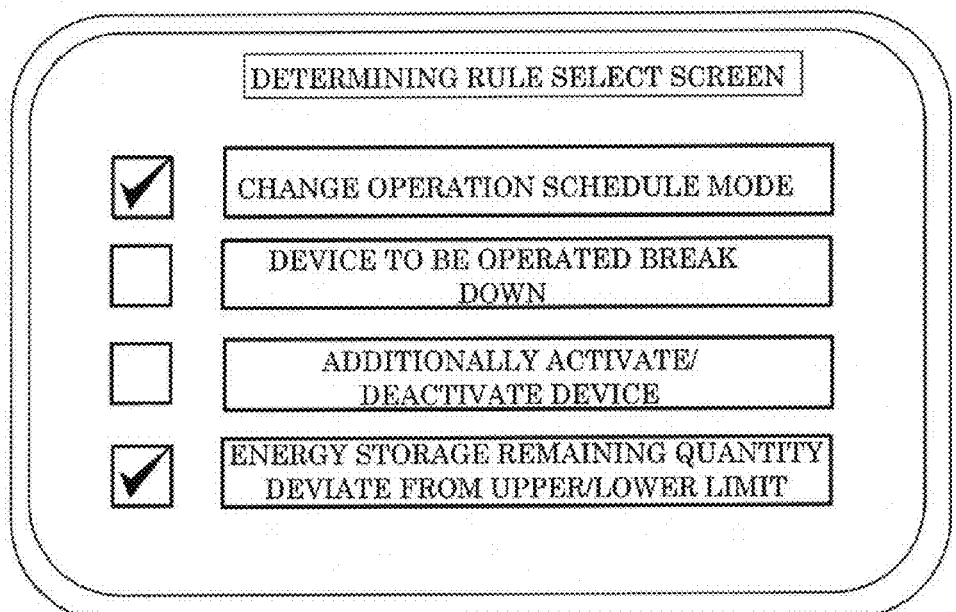
FIG. 24 is a diagram illustrating an example screen development in a determination rule selector of the fifth embodiment.

The facility operator selects a determining rule at an arbitrary timing, and then the selected determining rule is applied to the approval request determining process by the approval request determining block 12. FIG. 24 illustrates an example screen development in the determining rule selecting block 16.

In FIG. 24, all determining rules stored in the operation schedule optimizing device 4 are displayed. When the check box of each rule is checked, such a rule is applied to the approval request determining block 12 thereafter. The number of checks can be zero or all check boxes can be checked. The [approval request determining process] in accordance with each determining rule is the same as the above-explained process.

[3. Advantageous Effects]

According to the fifth embodiment, it is possible for the facility operator to arbitrarily select the determining rule. Hence, the operation schedule optimizing device for electricity/heat storage facilities can be provided which maximally reduces the burden share to the facility operator in accordance with the characteristic of each plant and the value determination by the facility operator, and which ensures the optimized operation of the device in a building, etc., in accordance with the DR.

[F. Other Embodiments]

The present disclosure is not limited to the above-explained embodiments.

(1) The control-target apparatus is not limited to the above-explained ones. For example, as energy supply devices, instead of or in addition to the solar power generating device and the solar water cooler/heater, facilities that change an output depending on a weather condition like wind power generating facilities are applicable. The present disclosure is suitable for a BEMS (Building Energy Management System) that is a system which manages control-target apparatuses installed in predetermined architecture like a building. However, the installation location of the control-target apparatus is not limited to a single architecture or multiple architectures, and may be an outdoor location. That is, the present disclosure is widely applicable as an EMS (Energy Management System) that controls the control-target apparatus installed in a predetermined area.

(2) The operation schedule optimizing device, the local control device, and the terminals, etc., can be each realized by controlling a computer including a CPU by a predetermined program. The program in this case physically utilizes the hardware resources of the computer to realize the respective blocks explained above.

A method, a program, and a non-transitory recording medium having stored therein the program which executes the respective processes explained above are also embodiments of the present disclosure. In addition, how to set the range processed by hardware and the range processed by a software including the program is not limited to any particular structure. For example, any one of the above-explained blocks may be realized as a circuit that executes the process.

(3) The respective blocks and memories explained above may be realized in a common computer, or may be realized by multiple computers connected together via a network. For example, the process data memory and the optimized data memory may be realized on a server connected to the optimizing processor via a network.

Figure 25:
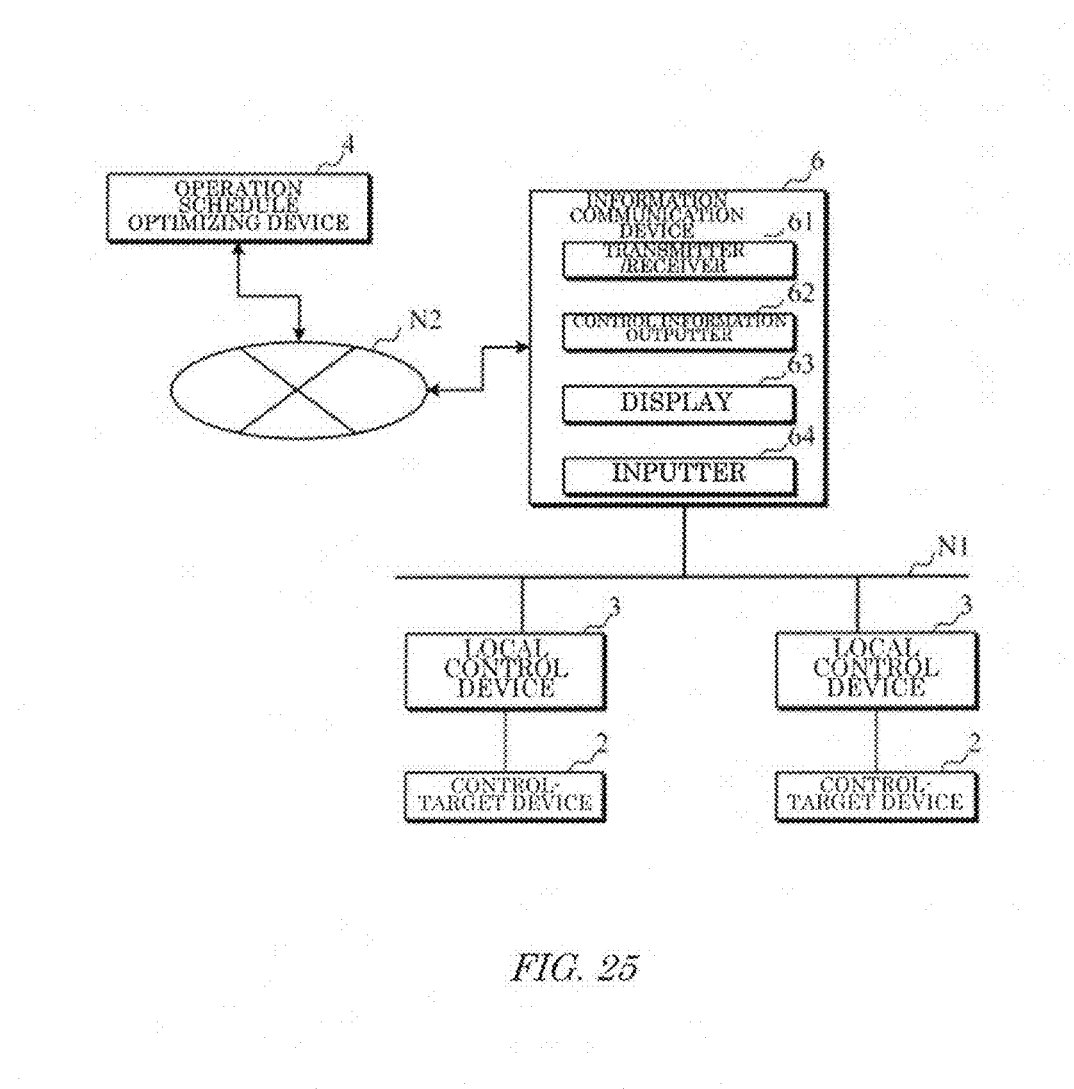
FIG. 25 is a block diagram of another embodiment.

In addition, as illustrated in FIG. 25, a structure in which the operation schedule optimizing device 4 installed remotely is connected to an information communication device 6 provided in architecture where the control-target apparatus 2 is installed via a network N2 may be employed. The information communication device 6 may include, for example, a personal computer, and a control panel.

The information communication device 6 includes, for example, a transmitter/receiver 61, an information outputter 62, and a display 63. The transmitter/receiver 61 is a processor that exchanges information with the operation schedule optimizing device 4. For example, the transmitter/receiver 61 receives an operation schedule containing control information from the operation schedule optimizing device 4, and transmits a selecting instruction of a preferential order or an operation schedule to the operation schedule optimizing device 4.

The control information outputter 62 is a processor that outputs control information to the local control device 3 connected via the network N2. The display 63 is a processor that displays the received operation schedule, etc., including the control information. An inputter 64 is a processor to input a selecting instruction of the preferential order or the operation schedule, etc. The display 63 and the inputter 64 function as a schedule display 26 and a preferential-order inputter 25.

In addition, only a receiver that receives control information output by the operation schedule optimizing device 4 may be provided at the consumer's end, and the local control device 3 may be controlled based on the control information received by the receiver. The embodiment in which the operation schedule optimizing device 4 is realized by a single or multiple servers provided at a remote location from the control-target apparatus 2 via a network like a cloud computer as explained above is also an embodiment of the present disclosure. According to this structure, the facilities at the consumer's end can be simplified, the installation costs can be reduced, thereby prompting a popularization.

(4) The memory areas for respective data stored in the process data memory and the optimized data memory can be utilized as the memories for respective pieces of data. Those memories typically realized by various built-in or external memories, and hard disks, etc. The memory includes all memory media available currently or in future. A register, etc., utilized for a computation can be deemed as such a memory. As to the way of storing, not only the way of storing information for a long time but also the way of temporary storing information for a process, and of erasing or updating the information within a short time are applicable.

(5) The specific detail and value of information utilized in the embodiments are not limited to the particular detail and value. In the above-explained embodiments, in a large/small determination relative to a threshold, and a matching/mismatching determination, it is optional to perform determination based on criteria, such as equal to or greater than, equal to or smaller than, larger than, smaller than, exceeding, not exceeding, beyond, below, and less than. Hence, depending on the setting of a value, there is no substantial difference when "equal to or larger than", "exceeding", and "equal to or smaller than" are read as "larger than", "beyond", and "smaller than", "not exceeding", "lower than", "less than", respectively.

(6) Several embodiments of the present disclosure were explained in this specification, but those embodiments are merely presented as examples, and are not intended to limit the scope and spirit of the present disclosure. The above-explained embodiments can be carried out in various other forms, and permit various omissions, replacements, and modifications without departing from the scope and spirit of the present disclosure. Such embodiments and modifications thereof are within the scope and spirit of the present disclosure, and also within an equivalent range to the subject matter as recited in appended claims.

REFERENCE SIGNS LIST

1 Building
2 Control-target apparatus
3 Local control devices
4 Operation schedule optimizing device
5 Operation schedule optimizing system
6 Information communication device
10 Energy predicting block
11 Schedule optimizing block
12 Approval request determining block
13 Determination result transmitting block
14 Control information output block
15 Start instructing block
20 Data obtainer
21 Setting parameter inputter
22 Process data memory
23 Optimized data memory
24 Transmitter/receiver
40 Optimizing processor
61 Transmitter/receiver
62 Information outputter
63 Display
100 Battery
101 PV
102 CGS(Co-Generation System)
103 Electric refrigerator
104 Absorption water cooler/heater
105 Heat storage tank
111 Air conditioner
N1, N2 Network

The invention claimed is:

1. An operation schedule optimizing device for a control-target apparatus that supplies, consumes or stores energy, the operation schedule optimizing device comprising:
an energy predictor predicting, for the control-target apparatus, an energy consumption or an energy supply within a predetermined future time period based on process data;
a schedule optimizer optimizing, in a preset timing or a preset period, a normal operation schedule and an operation schedule in accordance with a demand response of the control-target apparatus within the predetermined time period with a predetermined evaluation barometer based on the predicted value, a characteristic of the control-target apparatus, and the process data;
an approval request determiner determining whether to request an approval from a user to change an operation schedule currently applied to the control-target apparatus to one of the normal operation schedule and the operation schedule in accordance with the demand response, both optimized by the schedule optimizer, or not;
a transmitter transmitting the operation schedule to the user when the approval request determiner determines that it is necessary to request the approval from the user; and
a control information outputter outputting, to the control target apparatus, the control information relating to the operation schedule approved by the user transmitted by the transmitter,
wherein a determining condition used by the approval request determiner involves comparing the evaluation barometer of the normal operation schedule and of the operation schedule in accordance with the demand response, both optimized by the schedule optimizer, and is for changing the operation schedule currently applied to the control-target apparatus to the other operation schedule when the evaluation barometer of the other operation schedule is improved more than the evaluation barometer of the operation schedule currently applied to the control-target apparatus.

2. The operation schedule optimizing device according to claim 1, wherein the approval request determiner determines whether to request an approval for the optimized latest operation schedule or not when a device to be operated breaks down.

3. The operation schedule optimizing device according to claim 1, wherein the approval request determiner determines whether to request an approval for the optimized latest operation schedule or not when the predicted value of energy consumption goes out of a range of energy supply capacity in the operation schedule, and an activation/deactivation condition of the device to be operated changes.

4. The operation schedule optimizing device according to claim 1, wherein the approval request determiner determines whether to request an approval for the optimized latest operation schedule or not when the storage quantity of the control-target apparatus that stores energy goes out of a preset range.

5. The operation schedule optimizing device according to claim 4, wherein a limit value of the storage quantity is a range which is defined by a device characteristic and which must be maintained in an operation.

6. An operation schedule optimizing method for a control-target apparatus that supplies, consumes or stores energy, the operation schedule optimizing method comprising:
an energy predicting step of predicting, for the control-target apparatus, an energy consumption or energy supply within a predetermined future time period based on process data;
a schedule optimizing step of optimizing, in a preset time or a preset period, a normal operation schedule and an operation schedule in accordance with a demand response of the control-target apparatus within the predetermined time period with a predetermined evaluation barometer based on the predicted value, a characteristic of the control-target apparatus, and the process data;
an approval request determining step of determining whether to request an approval from a user to change an operation schedule currently applied to the control-target apparatus to one of the normal operation schedule and the operation schedule in accordance with the demand response both optimized by the schedule optimizing step, or not;
a transmitting step of transmitting the operation schedule to the user when the approval request determining step determines it is necessary to request the approval from the user; and a control information outputting step of outputting, to the control target apparatus, the a control information relating to the operation schedule approved by the user transmitted by the transmitting step, wherein a determining condition used by the approval request determining step involves comparing the evaluation barometer of the normal operation schedule and of the operation schedule in accordance with the demand response, both optimized by the schedule optimizing step, and is for changing the operation schedule currently applied to the control-target apparatus to the other operation schedule when the evaluation barometer of the other operation schedule is improved more than the evaluation barometer of the operation schedule currently applied to the control-target apparatus.

7. A non-transitory computer accessible medium storing an operation schedule optimizing program that realizes, using a computer, an operation schedule optimizing device for a control-target apparatus that supplies, consumes or store energy, the operation schedule optimizing program comprising:

an energy predicting function of predicting, for the control-target apparatus, an energy consumption of an energy consuming device or an energy supply of an energy supplying device within a predetermined future time period based on process data;

a schedule optimizing function of optimizing, in a preset timing or a preset period, a normal operation schedule and an operation schedule in accordance with a demand response of the control-target apparatus within the predetermined time period with a predetermined evaluation barometer based on the predicted value, a characteristic of the control-target apparatus, and the process data;

an approval request determining function of determining whether to request an approval from a user to change an operation schedule currently applied to the control-target apparatus to one of the normal operation schedule and the operation schedule in accordance with the demand response, both optimized by the schedule optimizing function, or not;

a transmitting function of transmitting the operation schedule to the user when the approval request determining function determines it is necessary to request the approval from the user; and a control information outputting function of outputting, to the control target apparatus, the a control information relating to the operation schedule approved by the user transmitted by the transmitting function, wherein a determining condition used by the approval request determining function involves comparing the evaluation barometer of the normal operation schedule and of the operation schedule in accordance with the demand response both optimized by the schedule optimizing function and is for selecting the operation schedule currently applied to the control-target apparatus to the other operation schedule when the evaluation barometer of the other operation schedule is improved more than the evaluation barometer of the operation schedule currently applied to the control-target apparatus.

* * * * *